(12) United States Patent
Kim

(10) Patent No.: US 12,370,863 B2
(45) Date of Patent: Jul. 29, 2025

(54) APPARATUS FOR CONTROLLING IN-CAR TEMPERATURE OF AUTONOMOUS VEHICLE, SYSTEM INCLUDING THE SAME, AND METHOD THEREOF

(71) Applicants: Hyundai Motor Company, Seoul (KR); Kia Corporation, Seoul (KR)

(72) Inventor: Dong Hyuk Kim, Hanam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 346 days.

(21) Appl. No.: 17/874,121

(22) Filed: Jul. 26, 2022

(65) Prior Publication Data

US 2023/0150336 A1    May 18, 2023

(30) Foreign Application Priority Data

Nov. 18, 2021  (KR) .......................... 10-2021-0159627

(51) Int. Cl.
  *B60H 1/00*  (2006.01)
  *B60W 60/00*  (2020.01)

(52) U.S. Cl.
  CPC ....... *B60H 1/0073* (2019.05); *B60H 1/00357* (2013.01); *B60W 60/0013* (2020.02);
  (Continued)

(58) Field of Classification Search
  CPC ............. B60H 1/0073; B60H 1/00357; B60H 1/0075; B60H 1/00771; B60H 1/00778;
  (Continued)

(56) References Cited

U.S. PATENT DOCUMENTS 10,528,829 B2   1/2020  Kim et al.
10,565,877 B2   2/2020  Dudar
(Continued)

FOREIGN PATENT DOCUMENTS

KR          0172219 B    3/1999
KR       10-1850795 B    4/2018
KR    10-2019-0067962 A  6/2019

*Primary Examiner* — Hunter B Lonsberry
*Assistant Examiner* — Jalal C Coduroglu
(74) *Attorney, Agent, or Firm* — MORGAN, LEWIS & BOCKIUS LLP

(57) ABSTRACT

An apparatus, a system, and a method for controlling an in-car temperature of an autonomous vehicle are provided. The control server determines an expected in-car temperature according to a re-riding time of each of one or more parking positions corresponding to a destination or a re-riding position of an autonomous vehicle, selects an optimal parking position or a temporary parking position based on the expected in-car temperature and an outdoor air temperature according to the re-riding time, transmits information about the optimal parking position or the temporary parking position to the autonomous vehicle. The controller of the autonomous vehicle is configured to perform autonomous driving and autonomous parking depending on the information about the optimal parking position or the temporary parking position, recognizes a voice of a user, determines autonomous driving related control corresponding to the voice of the user, and performs the autonomous driving related control corresponding to the voice of the user.

19 Claims, 16 Drawing Sheets

(52) U.S. Cl.
CPC ..... *B60W 2520/04* (2013.01); *B60W 2554/20* (2020.02); *B60W 2555/20* (2020.02); *B60W 2556/45* (2020.02)

(58) Field of Classification Search
CPC ......... B60W 60/0013; B60W 2520/04; B60W 2554/20; B60W 2555/20; B60W 2556/45; B60W 60/0011; B60W 30/06; B60W 30/18027; B60W 60/001; B60W 60/0025; B60W 2420/403; B60W 2420/408; B60W 2530/00; B60W 2555/00; B60W 2556/50; B60W 40/02
See application file for complete search history.

(56) References Cited

U.S. PATENT DOCUMENTS

| | | | |
|---|---|---|---|
| 10,964,214 B2 | 3/2021 | Wisbrun | |
| 2016/0221579 A1* | 8/2016 | Sasahara | B60W 10/06 |
| 2017/0132482 A1 | 5/2017 | Kim et al. | |
| 2018/0300676 A1* | 10/2018 | Peterson | B60Q 1/507 |
| 2019/0051155 A1* | 2/2019 | Yamaguchi | G08G 1/0965 |
| 2019/0111916 A1* | 4/2019 | Lee | G08G 1/143 |
| 2019/0164421 A1* | 5/2019 | Lauer | G08G 1/096775 |
| 2019/0171209 A1* | 6/2019 | Lee | G08G 1/143 |
| 2019/0299979 A1* | 10/2019 | Sadakiyo | B62D 15/0285 |
| 2019/0382001 A1* | 12/2019 | Chelian | G08G 1/147 |
| 2020/0307559 A1* | 10/2020 | Göricke | B60W 10/20 |
| 2021/0331701 A1* | 10/2021 | Hur | H04W 4/44 |
| 2022/0024280 A1* | 1/2022 | Austin | B60H 1/00807 |
| 2022/0203969 A1* | 6/2022 | Hidaka | G05D 1/0282 |

\* cited by examiner

APPARATUS FOR CONTROLLING IN-CAR TEMPERATURE OF AUTONOMOUS VEHICLE, SYSTEM INCLUDING THE SAME, AND METHOD THEREOF

CROSS-REFERENCE TO RELATED APPLICATION

The present application claims priority to Korean Patent Application No. 10-2021-0159627, filed on Nov. 18, 2021, the entire contents of which is incorporated herein for all purposes by this reference.

BACKGROUND OF THE PRESENT DISCLOSURE

Field of the Present Disclosure

The present disclosure relates to an apparatus of controlling an in-car temperature of an autonomous vehicle, a system including the same, and a method thereof, and more particularly, relates to an apparatus, a system, and a method for controlling an in-car temperature of an autonomous vehicle in conjunction with parking.

Description of Related Art

An autonomous vehicle configured for performing driving, braking, and steering on behalf of a driver to reduce the fatigue of the driver requires an ability to respond adaptively according to a surrounding situation which is changed in real time while driving. First of all, a reliable determination control function is required to mass produce and activate autonomous vehicles. Recently, the autonomous vehicle is loaded with a highway driving assist (HDA) function, a driver status warning (DSW) function of determining driver carelessness, such as drowsiness or gaze departure, and state abnormality and outputting a warning alarm through a cluster or the like, a driver awareness warning (DAW) function of identifying whether the vehicle crosses the line and performs unstable driving by a front view camera, a forward collision-avoidance assist (FCA) or active emergency brake system (AEBS) function of performing emergency braking when detecting a head on collision, or the like to be sold.

Furthermore, for fully autonomous driving, the autonomous vehicle drives by itself without the driver to move to a target position and may perform autonomous parking using such a function. Furthermore, the autonomous vehicle may move to a desired position in a state where there is no driver when the autonomous vehicle is parked. For convenience of the user, there is a need to develop a technology for moving the autonomous vehicle to a suitable position according to an external environment and controlling an in-car temperature of the autonomous vehicle to be close to a desired temperature, using such an autonomous driving technology.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus, a system and a method for controlling an in-car temperature of an autonomous vehicle in conjunction with parking.

Another aspect of the present disclosure provides an apparatus of controlling an in-car temperature of an autonomous vehicle to move the parked autonomous vehicle to a suitable place to suitably maintain an in-car temperature, a system including the same, and a method thereof.

Another aspect of the present disclosure provides an apparatus of controlling an in-car temperature of an autonomous vehicle to move the parked autonomous vehicle to a suitable place to minimize air conditioning control and adjust an in-car temperature to be close to a desired target temperature, a system including the same, and a method thereof.

Another aspect of the present disclosure provides an apparatus of controlling an in-car temperature of an autonomous vehicle to minimize air conditioning control to improve fuel efficiency of the autonomous vehicle, a system including the same, and a method thereof.

Another aspect of the present disclosure provides an apparatus of controlling an in-car temperature of an autonomous vehicle to adjust an in-car temperature of the autonomous vehicle to increase satisfaction provided to the user who rides in the autonomous vehicle when the autonomous vehicle exits, a system including the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus of controlling an in-car temperature of an autonomous vehicle may include a sensor device provided in the autonomous vehicle to obtain environmental information around the autonomous vehicle, a communication device that communicates with a control server, and a controller that transmits the environmental information related to the autonomous vehicle to the control server through the communication device, receive information related to an optimal parking position or a temporal parking position selected based on an expected in-car temperature and an outdoor air temperature according to a re-riding time of each of one or more parking positions corresponding to a destination or a re-riding position of the autonomous vehicle from the control server, through the communication device, and perform autonomous driving and autonomous parking according to the information related to the optimal parking position or the temporary parking position.

In an exemplary embodiment of the present disclosure, the controller may perform autonomous exit, when an exit command is received from the control server through the communication device and may perform internal air conditioning control based on a predetermined target temperature.

In an exemplary embodiment of the present disclosure, the controller may redetermine the expected in-car temperature according to the re-riding time, based on a time when a part or all of the autonomous vehicle is disposed in a shadow generated by a surrounding building or a surrounding object and an initial in-car temperature, when performing the autonomous driving or the autonomous parking in the optimal parking position.

According to another aspect of the present disclosure, a system for controlling an in-car temperature of an autonomous vehicle may include a control server that determines an expected in-car temperature according to a re-riding time of each of one or more parking positions corresponding to a destination or a re-riding position of the autonomous vehicle, selects an optimal parking position or a temporary parking position based on the expected in-car temperature, an outdoor air temperature according to the re-riding time, and a predetermined target temperature, and transmits information related to the optimal parking position or the temporary parking position to the autonomous vehicle and the autonomous vehicle that performs autonomous driving and autonomous parking according to the information related to the optimal parking position or the temporary parking position.

In an exemplary embodiment of the present disclosure, the control server may select the one or more parking positions corresponding to the destination or the re-riding position, based on a distance away from the destination or the re-riding position.

In an exemplary embodiment of the present disclosure, the control server may compare a difference between the expected in-car temperature and the target temperature with a difference between an outdoor air temperature according to the re-riding time and the target temperature to select the optimal parking position or the temporary parking position.

In an exemplary embodiment of the present disclosure, the control server may select a parking position having the expected in-car temperature closest to the target temperature as the optimal parking position, when there is a parking position where a value obtained by subtracting the difference between the expected in-car temperature and the target temperature from the difference between the outdoor air temperature according to the re-riding time and the target temperature is greater than a threshold.

In an exemplary embodiment of the present disclosure, the control server may select the temporary parking position, based on a distance away from the destination or the re-riding position, when there is no parking position where a value obtained by subtracting the difference between the expected in-car temperature and the target temperature from the difference between the outdoor air temperature according to the re-riding time and the target temperature is greater than a threshold.

In an exemplary embodiment of the present disclosure, the control server may select a parking position having the expected in-car temperature closest to the target temperature as the optimal parking position, when there is the parking position where the value obtained by subtracting the difference between the expected in-car temperature and the target temperature from the difference between the outdoor air temperature according to the re-riding time and the target temperature is greater than the threshold, when the autonomous vehicle is parked in the temporary parking position and may transmit information related to the optimal parking position to the autonomous vehicle. The autonomous vehicle may perform the autonomous driving and the autonomous parking in the optimal parking position in a state where the autonomous vehicle is parked in the temporary parking position.

In an exemplary embodiment of the present disclosure, the autonomous vehicle may redetermine the expected in-car temperature according to the re-riding time, based on a time when a part or all of the autonomous vehicle is disposed in a shadow generated by a surrounding building or a surrounding object and an initial in-car temperature, when performing the autonomous driving or the autonomous parking in the optimal parking position.

In an exemplary embodiment of the present disclosure, the autonomous vehicle may determine the time when the part or all of the autonomous vehicle is disposed in the shadow generated by the surrounding building or the surrounding object, based on a movement path of the sun identified based on at least one of a latitude, a longitude, an elevation angle, or an azimuth angle corresponding to a position of the autonomous vehicle.

In an exemplary embodiment of the present disclosure, the control server may determine whether there is a need to change a parking position of the autonomous vehicle, based on a difference between the redetermined expected in-car temperature and the target temperature.

In an exemplary embodiment of the present disclosure, the autonomous vehicle may redetermine the expected in-car temperature according to the re-riding time, with regard to at least one of a color of the autonomous vehicle, current weather, or a season.

In an exemplary embodiment of the present disclosure, the control server may transmit an exit command to the autonomous vehicle, when a time remaining until the re-riding time reaches a predetermined specific time. The autonomous vehicle may perform autonomous exit, when the exit command is received, and may perform internal air conditioning control based on the target temperature.

According to another aspect of the present disclosure, a method for controlling an in-car temperature of an autonomous vehicle may include determining, by a control server, an expected in-car temperature according to a re-riding time of each of one or more parking positions corresponding to a destination or a re-riding position of the autonomous vehicle, selecting, by the control server, an optimal parking position or a temporary parking position based on the expected in-car temperature and an outdoor air temperature according to the re-riding time, transmitting, by the control server, information related to the optimal parking position or the temporary parking position to the autonomous vehicle, and performing, by a controller of the autonomous vehicle, autonomous driving and autonomous parking according to the information related to the optimal parking position or the temporary parking position.

In an exemplary embodiment of the present disclosure, the selecting of the optimal parking position or the temporary parking position by the control server may include comparing, by the control server, a difference between the expected in-car temperature and a target temperature with a difference between an outdoor air temperature according to the re-riding time and the target temperature to select the optimal parking position or the temporary parking position.

In an exemplary embodiment of the present disclosure, the comparing of the difference between the expected in-car temperature and the target temperature with the difference between the outdoor air temperature according to the re-riding time and the target temperature to select the optimal parking position or the temporary parking position by the control server may include selecting, by the control server, a parking position having the expected in-car temperature closest to the target temperature as the optimal parking position, when there is a parking position where a value obtained by subtracting the difference between the expected in-car temperature and the target temperature from the difference between the outdoor air temperature according to the re-riding time and the target temperature is greater than a threshold.

In an exemplary embodiment of the present disclosure, the comparing of the difference between the expected in-car temperature and the target temperature with the difference between the outdoor air temperature according to the re-riding time and the target temperature to select the optimal parking position or the temporary parking position by the control server may include selecting, by the control server, the temporary parking position, based on a distance away from the destination or the re-riding position, when there is no parking position where a value obtained by subtracting the difference between the expected in-car temperature and the target temperature from the difference between the outdoor air temperature according to the re-riding time and the target temperature is greater than a threshold.

In an exemplary embodiment of the present disclosure, the method may further include redetermining the expected in-car temperature according to the re-riding time, based on a time when a part or all of the autonomous vehicle is disposed in a shadow generated by a surrounding building or a surrounding object and an initial in-car temperature, when performing the autonomous driving or the autonomous parking in the optimal parking position.

In an exemplary embodiment of the present disclosure, the redetermining of the expected in-car temperature according to the re-riding time by the autonomous vehicle may include determining, by the autonomous vehicle, the time when the part or all of the autonomous vehicle is disposed in the shadow generated by the surrounding building or the surrounding object, based on a movement path of the sun identified based on at least one of a latitude, a longitude, an elevation angle, or an azimuth angle corresponding to a position of the autonomous vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
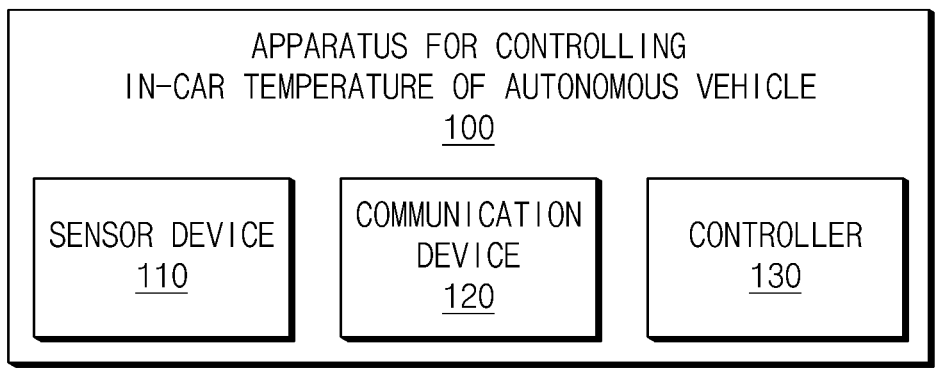
FIG. 1 is a block diagram illustrating an apparatus of controlling an in-car temperature of an autonomous vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIGS. 1 to 10.

FIG. 1 is a block diagram illustrating an apparatus of controlling an in-car temperature of an autonomous vehicle according to an exemplary embodiment of the present disclosure.

Referring to FIG. 1, an apparatus 100 for controlling an in-car temperature of an autonomous vehicle may include a sensor device 110, a communication device 120, and a controller 130.

The sensor device 110 may be provided in an autonomous vehicle to obtain environmental information around the autonomous vehicle.

As an exemplary embodiment of the present disclosure, the sensor device 110 may include at least one of a camera, a light detection and ranging (LiDAR), or a radar.

As an exemplary embodiment of the present disclosure, the sensor device 110 may obtain information, such as a position, a size, and a height about a building or an object around the autonomous vehicle, by at least one of the camera, the LiDAR, or the radar.

As an exemplary embodiment of the present disclosure, the sensor device 110 may be directly or indirectly connected to the controller 130 through wireless or wired communication to transmit the obtained environmental information around the autonomous vehicle to the controller 130.

The communication device 120 may communicate with a control server.

The communication device 120 may communicate with the control server using various communication schemes and may transmit and receive data. For example, the communication device 120 may use a wireless-fidelity (Wi-Fi) scheme, a Bluetooth scheme, a ZigBee scheme, an ultra-wide band (UWB) scheme, or a near field communication (NFC) scheme.

The controller 130 may perform the overall control so that respective components may normally perform their own functions. Such a controller 130 may be implemented in a form of hardware, may be implemented in a form of software, or may be implemented in a form of a combination thereof. The controller 130 may be implemented as, but not limited to, a microprocessor. Furthermore, the controller 130 may perform a variety of data processing, determination, and the like described below.

The controller 130 may receive information related to an optimal parking position or a temporal parking position selected based on an expected in-car temperature and an outdoor air temperature according to a re-riding time of each of one or more parking positions corresponding to a destination or a re-riding position of the autonomous vehicle from the control server, through the communication device 120.

The control server may select an optimal parking position or a temporary parking position based on the expected in-car temperature and the outdoor air temperature according to the re-riding time of each of the one or more parking positions corresponding to the destination or the re-riding position of the autonomous vehicle. Detailed contents thereof will be described with reference to FIG. 2 below.

The controller 130 may perform autonomous driving and autonomous parking depending on information related to the optimal parking position or the temporary parking position.

The optimal parking position may be defined as a parking position determined as being most suitable among parking positions meeting a predetermined condition.

The temporary parking position may be defined as a parking position for temporarily parking a vehicle near the destination or the re-riding position, when there is no parking position meeting the predetermined condition near the destination or the re-riding position.

As an exemplary embodiment of the present disclosure, the predetermined condition for the optimal parking position or the temporary parking position may be a condition set based on an expected target temperature or a target temperature when a user re-rides in the vehicle.

Furthermore, the optimal parking position determined as being most suitable may be selected based on a difference between the expected target temperature and the target temperature when the user re-rides in the vehicle.

When an exit command is received from the control server through the communication device 120, the controller 130 may perform autonomous exit and may perform internal air conditioning control based on a predetermined target temperature.

As an exemplary embodiment of the present disclosure, when the predetermined target temperature is higher than an in-car temperature or an expected in-car temperature upon re-riding, the controller 130 may operate a vehicle heater to increase the in-car temperature.

As an exemplary embodiment of the present disclosure, when the predetermined target temperature is lower than the in-car temperature or the expected in-car temperature upon re-riding, the controller 130 may operate a vehicle air conditioner to decrease the in-car temperature.

As an exemplary embodiment of the present disclosure, when performing autonomous driving or autonomous parking in the optimal parking position, the controller 130 may redetermine an expected in-car temperature according to a re-riding time, based on a time when a part or all of the autonomous vehicle is disposed in a shadow generated by a surrounding building or a surrounding object and an initial in-car temperature.

A description will be provided of contents where the controller 130 redetermines the expected in-car temperature according to the re-riding time with reference to FIG. 2 below.

Figure 2:
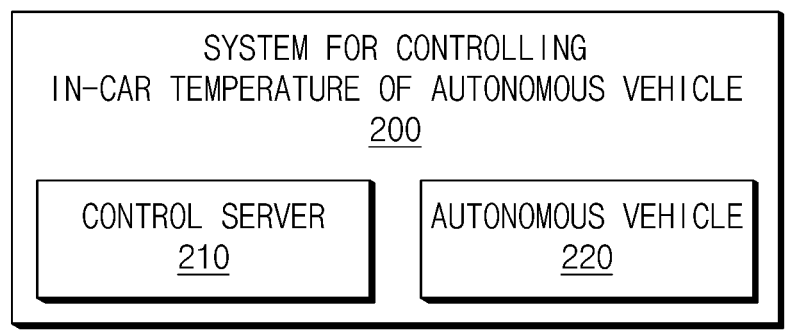
FIG. 2 is a block diagram illustrating a system for controlling an in-car temperature of an autonomous vehicle according to an exemplary embodiment of the present disclosure.

FIG. 2 is a block diagram illustrating a system for controlling an in-car temperature of an autonomous vehicle according to an exemplary embodiment of the present disclosure.

Referring to FIG. 2, a system 200 for controlling an in-car temperature of an autonomous vehicle may include a control server 210 and an autonomous vehicle 220.

The control server 210 may communicate with one or more autonomous vehicles to manage and/or control the one or more autonomous vehicles.

The control server 210 may determine an expected in-car temperature according to a re-riding time of each of one or more parking positions corresponding to a destination or a re-riding position of the autonomous vehicle 220.

As an exemplary embodiment of the present disclosure, the control server 210 may include a processor which performs various determination to determine the expected in-car temperature according to the re-riding time of each of the one or more parking positions corresponding to the destination or the re-riding position.

As an exemplary embodiment of the present disclosure, the control server 210 may receive the result of determining an expected in-car temperature according to a re-riding time for a corresponding parking position in which each of one or more connected autonomous vehicles is parked and may determine the expected in-car temperature according to the re-riding time of each of the one or more parking positions corresponding to the destination or the re-riding position of the autonomous vehicle 220, based on the received result.

As an exemplary embodiment of the present disclosure, the control server 210 may select the one or more parking positions corresponding to the destination or the re-riding position, based on a distance away from the destination or the re-riding position.

As an exemplary embodiment of the present disclosure, the control server 210 may select parking positions where the distance away from the destination or the re-riding position is within a specific distance and may determine an expected in-car temperature according to a re-riding time of each of the parking positions.

As an exemplary embodiment of the present disclosure, when there is no parking position where the distance away from the destination or the re-riding position is within a first specific distance, the control server 210 may select parking positions where the distance away from the destination or the re-riding position is within a second specific distance longer than a first specific distance and may determine an expected in-car temperature according to a re-riding time of each of the parking positions.

The control server 210 may select an optimal parking position or a temporary parking position, based on the expected in-car temperature, an outdoor air temperature according to the re-riding time, and a predetermined target temperature.

As an exemplary embodiment of the present disclosure, the control server 210 may compare a difference between the expected in-car temperature and the target temperature with a difference between the outdoor air temperature according to the re-riding time and the target temperature to select the optimal parking position or the temporary parking position.

As an exemplary embodiment of the present disclosure, when there is a parking position where a value obtained by subtracting the difference between the expected in-car temperature and the target temperature from the difference between the outdoor air temperature according to the re-riding time and the target temperature is greater than a threshold, the control server 210 may select a parking position having an expected in-car temperature closest to the target temperature as the optimal parking position.

As an exemplary embodiment of the present disclosure, the target temperature may be set to 20° C. at which the user feels comfortable, but not limited thereto. The target temperature may be set to another temperature and may be set so that the target temperature is input by the user.

As an exemplary embodiment of the present disclosure, the threshold may be set to 10° C., but not limited thereto. The threshold may be set another temperature.

As an exemplary embodiment of the present disclosure, when there is no parking position where the value obtained by subtracting the difference between the expected in-car temperature and the target temperature from the difference between the outdoor air temperature according to the re-riding time and the target temperature is greater than the threshold, the control server 210 may fail to select an optimal parking position and may select a temporal parking position based on the distance away from the re-riding position.

As an exemplary embodiment of the present disclosure, the control server 210 may select a parking position closest to the destination or the re-riding position as the temporary parking position.

As an exemplary embodiment of the present disclosure, although there are the parking positions where the value obtained by subtracting the difference between the expected in-car temperature and the target temperature from the difference between the outdoor air temperature according to the re-riding time and the target temperature is greater than the threshold, when it is impossible to park in the parking positions because other vehicles are parked in all the parking positions, the control server 210 may select a parking position close to the parking positions as the temporary parking position.

As an exemplary embodiment of the present disclosure, the control server 210 may select a parking position closest to the parking positions as the temporary parking position.

Furthermore, in the instant case, the control server 210 may identify whether the number of vehicles configured for parking in the parking positions is greater than or equal to the predetermined specific number of vehicles configured for parking. When the number of vehicles configured for parking in the parking positions is greater than or equal to the predetermined specific number of vehicles configured for parking, the control server 210 may select a parking position close to the parking positions as the temporary parking position.

As an exemplary embodiment of the present disclosure, when the autonomous vehicle 220 is parked in the temporary parking position, when there is the parking position where the value obtained by subtracting the difference between the expected in-car temperature and the target temperature from the difference between the outdoor air temperature according to the re-riding time and the target temperature is greater than the threshold, the control server 210 may select a parking position having an expected in-car temperature closest to the target temperature as the optimal parking position and may transmit information related to the selected optimal parking position to the autonomous vehicle 220.

As an exemplary embodiment of the present disclosure, the control server 210 may identify whether there is a parking position, which is present within a specific distance from a re-riding position, is configured for being parked, and meets a predetermined temperature condition (e.g., a condition where the value obtained by subtracting the difference between the expected in-car temperature and the target temperature from the difference between the outdoor air temperature according to the re-riding time and the target temperature is greater than the threshold), in real time, even when the autonomous vehicle 220 is parked in the temporary parking position.

As an exemplary embodiment of the present disclosure, the autonomous vehicle 220 may perform autonomous driving and autonomous parking in the optimal parking position in a state where it is parked in the temporary parking position.

As an exemplary embodiment of the present disclosure, when information related to the selected optimal parking position is received from the control server 210 in a state where the autonomous vehicle 220 is parked in the temporary parking position, the autonomous vehicle 220 may perform autonomous driving and autonomous parking in the optimal parking position.

The control server 210 may transmit information related to the optimal parking position or the temporary parking position to the autonomous vehicle 220.

As an exemplary embodiment of the present disclosure, the control server 210 may include a communication module which communicates with one or more autonomous vehicles including the autonomous vehicle 220.

The autonomous vehicle 220 may perform autonomous driving and autonomous parking according to the information related to the optimal parking position or the temporary parking position.

When the autonomous vehicle 220 is parked in the optimal parking position, a comfortable riding environment may be provided to the user because the autonomous vehicle 220 is closest to the target temperature when the autonomous vehicle 220 exits. When air conditioning control for rendering an in-car temperature close to the target temperature is performed, energy may be saved and fuel efficiency may be improved.

As an exemplary embodiment of the present disclosure, when performing the autonomous driving and the autonomous parking in the optimal parking position, the autonomous vehicle 220 may redetermine an expected in-car temperature according to a re-riding time, based on a time when a part or all of the autonomous vehicle 220 is included in a shadow generated by a surrounding building or a surrounding object and an initial in-car temperature.

As an exemplary embodiment of the present disclosure, the autonomous vehicle 220 may determine the time when the part or all of the autonomous vehicle 220 is included in the shadow generated by the surrounding building or the surrounding object, based on a movement path of the sun identified based on at least one of a latitude, a longitude, an elevation angle, or an azimuth angle corresponding to the position of the autonomous vehicle 220.

A description will be provided in detail of the process where the autonomous vehicle 220 determines the time when the part or all of the autonomous vehicle 220 is included in the shadow generated by the surrounding building or the surrounding object with reference to FIGS. 7A, 7B, 8A, 8B, and 8C below.

As an exemplary embodiment of the present disclosure, the control server 210 may determine whether there is a need to change a parking position of the autonomous vehicle 220, based on a difference between the redetermined expected in-car temperature and the target temperature.

As an exemplary embodiment of the present disclosure, the autonomous vehicle 220 may redetermine an expected in-car temperature according to a re-riding time, with regard to at least one of a color of the autonomous vehicle 220, current weather, or a season.

As an exemplary embodiment of the present disclosure, the autonomous vehicle 220 may obtain information related to the color of the autonomous vehicle 220 by initial setting information of the autonomous vehicle 220.

As an exemplary embodiment of the present disclosure, the autonomous vehicle 220 may obtain information related to the current weather or the season by navigation information.

As an exemplary embodiment of the present disclosure, the autonomous vehicle 220 may determine a rate of increase in in-car temperature per hour when the autonomous vehicle 220 is included in the shadow and a rate of increase in in-car temperature per hour when the autonomous vehicle 220 is not included in the shadow, depending on at least one of the color of the autonomous vehicle 220, the current weather, or the season.

As an exemplary embodiment of the present disclosure, the autonomous vehicle 220 may determine an expected in-car temperature according to a re-riding time, based on an initial in-car temperature of the autonomous vehicle 220, a time when the autonomous vehicle 220 is included in the shadow before the user rides in the autonomous vehicle 220, a time when the autonomous vehicle 220 is not included in the shadow before the user rides in the autonomous vehicle 220, a rate of increase in in-car temperature per hour when the autonomous vehicle 220 is included in the shadow, and a rate of increase in in-car temperature per hour when the autonomous vehicle 220 is not included in the shadow.

As an exemplary embodiment of the present disclosure, the autonomous vehicle 220 may determine an expected in-car temperature according to a re-riding time by Equation 1 below.

$$\begin{aligned}&\text{(initial in-car temperature)} + ((\text{time spent in shadow}) * \\ &\quad (\text{rate of increase in in-car temperature in} \\ &\quad \text{shadow according to color of host vehicle,} \\ &\quad \text{weather, season and current time})) + ((\text{time spent} \\ &\quad \text{out of shadow}) * (\text{rate of increase in temperature} \\ &\quad \text{according to color of host vehicle, weather, season and time})) = (\text{expected in-car temperature} \\ &\quad \text{according to re-riding time}) \end{aligned} \quad [\text{Equation 1}]$$

For example, it may be assumed that the time before the user rides in the autonomous vehicle 220 is 2 hours, that the color of the autonomous vehicle 220 is a black color, that the current weather is sunny, that the current season is summer, that the current time is 14 o'clock, that the time when the autonomous vehicle 220 is included in the shadow before the user rides in the autonomous vehicle 220 is 1 hour and 30 minutes, that the time when the autonomous vehicle 220 is not included in the shadow before the user rides in the autonomous vehicle 220 is 30 minutes, and that the initial temperature is 23° C.

In the instant case, a rate of increase in in-car temperature per hour when the autonomous vehicle 220 is included in the shadow may be 1° C. per 10 minutes, and a rate of increase in in-car temperature per hour when the autonomous vehicle 220 is not included in the shadow may be 4° C. per 10 minutes.

At the present time, the expected in-car temperature according to the re-riding time may be determined as $23+(9*1)+(3*4)=44(° C.)$.

As an exemplary embodiment of the present disclosure, when a time remaining until the re-riding time arrives at a predetermined specific time, the control server 210 may transmit an exit command to the autonomous vehicle 220.

As an exemplary embodiment of the present disclosure, when receiving the exit command, the autonomous vehicle 220 may perform autonomous exit and may perform internal air conditioning control based on a target temperature.

As an exemplary embodiment of the present disclosure, when the predetermined target temperature is higher than an in-car temperature or an expected in-car temperature upon re-riding, the autonomous vehicle 220 may operate a vehicle heater to increase the in-car temperature.

As an exemplary embodiment of the present disclosure, when the predetermined target temperature is lower than the in-car temperature or the expected in-car temperature upon re-riding, the autonomous vehicle 220 may operate a vehicle air conditioner to decrease the in-car temperature.

Figure 3:
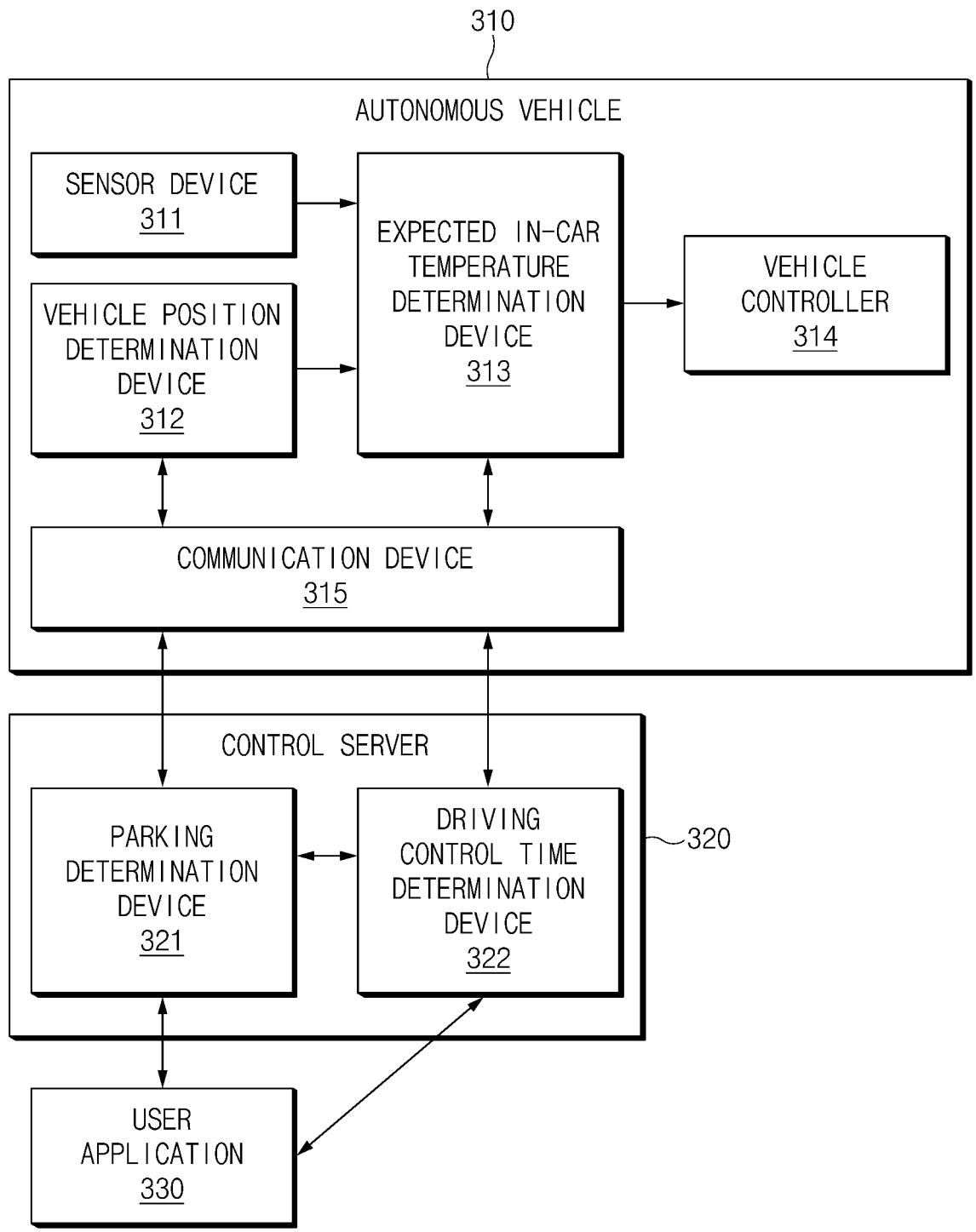
FIG. 3 is a drawing illustrating a detailed configuration and operation of a system for controlling an in-car temperature of an autonomous vehicle according to an exemplary embodiment of the present disclosure.

FIG. 3 is a drawing illustrating a detailed configuration and operation of a system for controlling an in-car temperature of an autonomous vehicle according to an exemplary embodiment of the present disclosure.

Referring to FIG. 3, an autonomous vehicle 310 may include a sensor device 311, a vehicle position determination device 312, an expected in-car temperature determination device 313, a vehicle controller 314, and a communication device 315.

The sensor device 311 may obtain information, such as a position, a size, and a height about a building or an object around the autonomous vehicle 310, by at least one of a camera, a Light Detection and Ranging (LiDAR), or a radar, and may deliver the obtained information to the expected in-car temperature determination device 313.

The vehicle position determination device 312 may include a global positioning system (GPS), may obtain position information including at least one of a latitude, a longitude, an elevation angle, or an azimuth angle through the GPS, and may deliver the obtained information to the expected in-car temperature 313 and the communication device 315.

The expected in-car temperature determination device 313 may determine an expected in-car temperature when the user rides in the autonomous vehicle 310, based on the information obtained by the sensor device 311 and the vehicle position determination device 312 and the information received from a control server 320 through the communication device 315.

The expected in-car temperature determination device 313 may deliver information related to the determined expected in-car temperature when the user rides in the autonomous vehicle 310 to the communication device 315.

Furthermore, the expected in-car temperature determination device 313 may transmit at least one of an autonomous driving command, an autonomous parking command, or an air conditioning control command to the vehicle controller 314, based on the determined expected in-car temperature when the user rides in the autonomous vehicle 310.

As an exemplary embodiment of the present disclosure, the expected in-car temperature determination device 313 may deliver information related to at least one of a target temperature or the expected in-car temperature to the vehicle controller 314.

The vehicle controller 314 may include an autonomous driving control module and/or an air conditioning control module.

The vehicle controller 314 may perform autonomous driving and autonomous parking in a set parking position, based on the information delivered from the expected in-car temperature determination device 313.

The vehicle controller 314 may perform air conditioning control, based on at least one of the target temperature, the in-car temperature, or the expected in-car temperature, when the autonomous vehicle 310 exits.

The communication device 315 may perform communication between the autonomous vehicle 310 and the control server 320.

The control server 320 may include a parking determination device 321 and a driving control time determination device 322.

The parking determination device 321 may determine an optimal parking position or a temporary parking position and may transmit the determined information to the autonomous vehicle 310.

The parking determination device 321 may determine an expected in-car temperature according to a re-riding time of each of one or more parking positions corresponding to a destination or a re-riding position of the autonomous vehicle 310 and may select an optimal parking position or a temporary parking position, based on the expected in-car temperature, an outdoor air temperature according to the re-riding time, and a predetermined target temperature.

The driving control time determination device 322 may determine a re-riding time after the autonomous vehicle 310 is stopped or parked and may deliver information related to the re-riding time to the parking determination device 321 and the communication device 315.

A user application 330 may be made up by hardware or software provided in a communication terminal of the user to receive information related to a re-riding time or the like from the user and transmit the received information to the parking determination device 321 and/or the driving control time determination device 322.

Furthermore, the user application 330 may receive information related to a parking position of the autonomous vehicle 310, information related to whether the autonomous vehicle 310 is parked in the temporary parking position, or information related to whether the autonomous vehicle 310 is parked in the optimal parking position and may display the received information on a display.

Figure 4A:
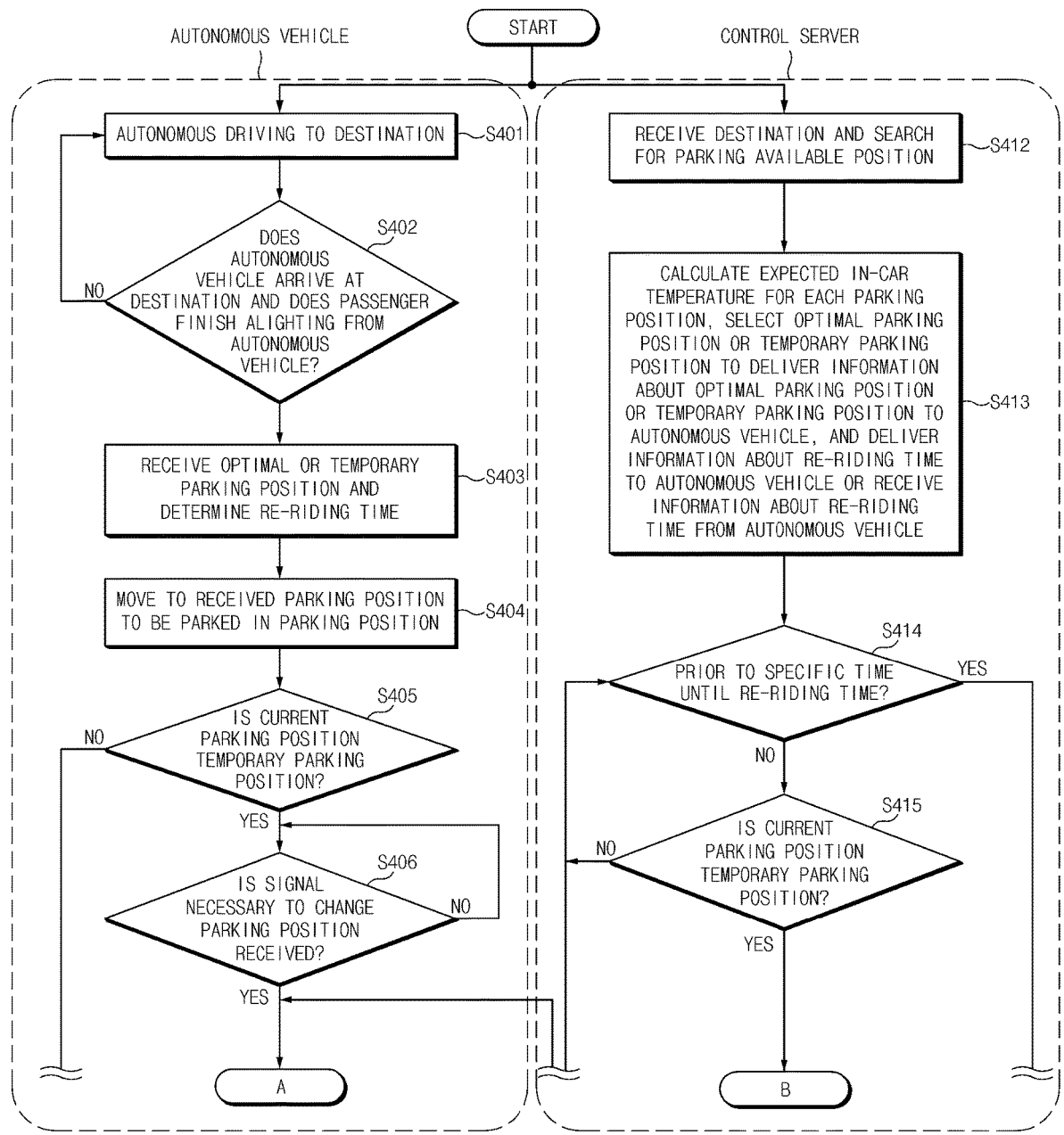
FIG. 4A and FIG. 4 B are flowcharts illustrating that a system for controlling an in-car temperature of an autonomous vehicle performs control depending on a temporal parking position according to an exemplary embodiment of the present disclosure.

FIG. 4A and FIG. 4 B are flowcharts illustrating that a system for controlling an in-car temperature of an autonomous vehicle performs control depending on a temporal parking position according to an exemplary embodiment of the present disclosure.

Figure 4B:
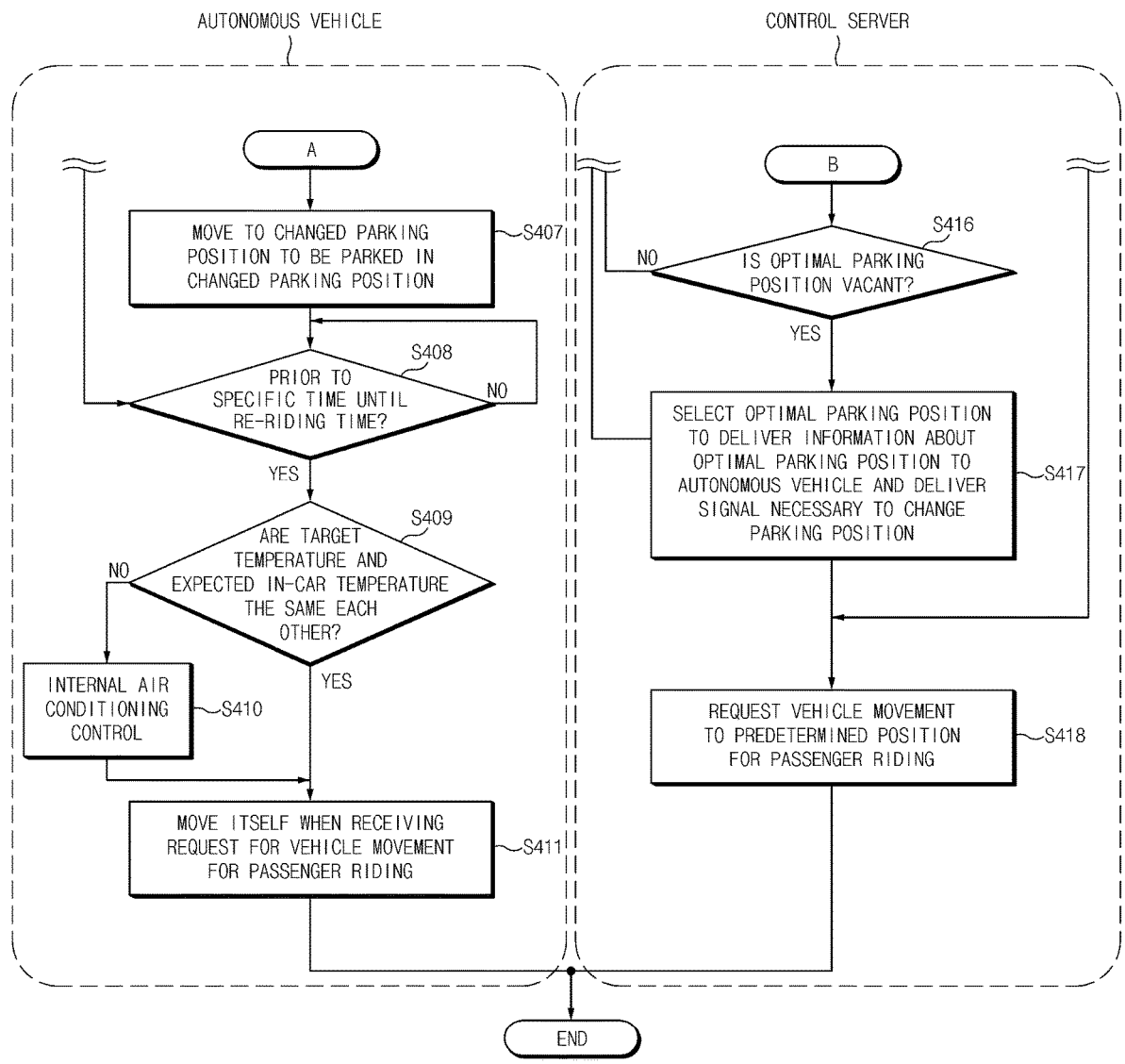

Referring to FIG. 4A and FIG. 4B, in S401, an autonomous vehicle 220 of FIG. 2 may perform autonomous driving to a destination.

After performing the autonomous driving to the destination in S401, in S402, the autonomous vehicle 220 may arrive at the destination and may identify whether a passenger finishes alighting from the autonomous vehicle 310.

As an exemplary embodiment of the present disclosure, the autonomous vehicle 220 may identify whether the passenger finishes alighting from the autonomous vehicle 220 by a sensor which identifies whether the passenger rides in the autonomous vehicle 220.

After arriving at the destination and identifying whether the passenger finishes alighting from the autonomous vehicle 220 in S402, when it is identified that the autonomous vehicle 220 does not arrive at the destination and the passenger does not finish alighting from the autonomous vehicle 220, the autonomous vehicle 220 may return to S401 to perform autonomous driving to the destination.

After arriving at the destination and identifying whether the passenger finishes alighting from the autonomous vehicle 220 in S402, when it is identified that the autonomous vehicle 220 arrives at the destination and the passenger finishes alighting from the autonomous vehicle 220, in S403, the autonomous vehicle 220 may receive an optimal parking position or a temporary parking position and may determine a re-riding time.

As an exemplary embodiment of the present disclosure, the autonomous vehicle 220 may receive information related to the optimal parking position or the temporary parking position from a control server 210 of FIG. 2.

As an exemplary embodiment of the present disclosure, the autonomous vehicle 220 may receive a re-riding time from a user and may transmit information related to the re-riding time to the control server 210.

After receiving the optimal parking position or the temporary parking position and determining the re-riding time in S403, in S404, the autonomous vehicle 220 may move to the received parking position to be parked in the parking position.

As an exemplary embodiment of the present disclosure, the autonomous vehicle 220 may perform autonomous driving to the received parking position and may perform autonomous parking in the parking position.

After moving to the received parking position to be parked in the parking position in S404, in S405, the autonomous vehicle 220 may identify whether the current parking position is a temporary parking position.

After identifying whether the current parking position is the temporary parking position in S405, when it is identified that the current parking position is not the temporary parking position, in S408, the autonomous vehicle 220 may identify whether a time remaining until the re-riding time reaches a predetermined specific time.

After identifying whether the current parking position is the temporary parking position in S405, when it is identified that the current parking position is the temporary parking position, in S406, the autonomous vehicle 220 may identify whether a signal necessary to change a parking position is received.

As an exemplary embodiment of the present disclosure, the autonomous vehicle 220 may receive the signal necessary to change the parking position from the control server 210.

After identifying whether the signal necessary to change the parking position is received in S406, when it is identified that the signal necessary to change the parking position is not received, the autonomous vehicle 220 may return to S406 to identify whether the signal necessary to change the parking position is received.

After identifying whether the signal necessary to change the parking position is received in S406, when it is identified that the signal necessary to change the parking position is received, in S407, the autonomous vehicle 220 may move to the changed parking position to be parked in the changed parking position.

As an exemplary embodiment of the present disclosure, the autonomous vehicle 220 may perform autonomous driving to the changed parking position received from the control server 210 and may perform autonomous parking in the parking position.

After moving to the changed parking position to be parked in the changed parking position in S407, in S408, the autonomous vehicle 220 may identify whether the time remaining until the re-riding time reaches the predetermined specific time.

When identifying whether the time remaining until the re-riding time reaches the predetermined specific time in S408, when it is identified that the time remaining until the re-riding time does not reach the predetermined specific time, the autonomous vehicle 220 may return to S408 to identify whether the time remaining until the re-riding time reaches the predetermined specific time.

When identifying whether the time remaining until the re-riding time reaches the predetermined specific time in S408, when it is identified that the time remaining until the re-riding time reaches the predetermined specific time, in S409, the autonomous vehicle 220 may identify whether a target temperature and an expected in-car temperature are the same as each other.

As an exemplary embodiment of the present disclosure, the autonomous vehicle 220 may receive information related to the target temperature and the expected in-car temperature from the control server 210.

As an exemplary embodiment of the present disclosure, the autonomous vehicle 220 may receive information related to the expected in-car temperature from the control server 210 and may receive the target temperature from the user.

When identifying whether the target temperature and the expected in-car temperature is the same as each other in S409, when it is identified that the target temperature and the expected in-car temperature is not the same as each other, in S410, the autonomous vehicle 220 may perform internal air conditioning control of the autonomous vehicle 220.

The autonomous vehicle 220 may compare the target temperature with the expected in-car temperature and may perform air conditioning control by a heater or an air conditioner of the autonomous vehicle 220.

After performing the internal air conditioning control of the autonomous vehicle 220, in S411, the autonomous vehicle 220 may receive a request for vehicle movement for passenger riding and may move itself.

As an exemplary embodiment of the present disclosure, the autonomous vehicle 220 may move itself and may perform internal air conditioning control of the autonomous vehicle 220.

When identifying whether the target temperature and the expected in-car temperature is the same as each other in S409, when it is identified that the target temperature and the expected in-car temperature is the same as each other, in S411, the autonomous vehicle 220 may receive a request for vehicle movement for passenger riding and may move itself.

As an exemplary embodiment of the present disclosure, the autonomous vehicle 220 may receive a request for vehicle movement for passenger riding from the control server 210.

As an exemplary embodiment of the present disclosure, the autonomous vehicle 220 may move itself to a re-riding position by autonomous driving.

In S412, the control server 210 may receive a destination and may search for a parking available position.

As an exemplary embodiment of the present disclosure, the control server 210 may receive information related to the destination from a user application or the autonomous vehicle 220 and may search for a parking available position based on a distance from the destination.

After receiving the destination and searching for the parking available position in S412, in S413, the control server 210 may determine an expected in-car temperature before departure for each parking position, may select an optimal parking position or a temporary parking position to deliver information related to the optimal parking position or the temporary parking position to the autonomous vehicle 220, and may deliver information related to a re-riding time to the autonomous vehicle 220 or may receive the information related to the re-riding time from the autonomous vehicle 220.

As an exemplary embodiment of the present disclosure, the control server 210 may receive information related to a re-riding time from the user application and may deliver the received information to the autonomous vehicle 220.

As an exemplary embodiment of the present disclosure, the control server 210 may determine an expected in-car temperature according to a re-riding time of each of one or more parking positions corresponding to the destination or the re-riding position of the autonomous vehicle 220 and may select an optimal parking position or a temporary parking position based on the expected in-car temperature, an outdoor air temperature according to the re-riding time, and a predetermined target temperature.

As an exemplary embodiment of the present disclosure, when there are optimal parking positions determined based on the expected in-car temperature, the outdoor air temperature according to the re-riding time, and the predetermined target temperature, but other vehicles are parked in all of parking spaces, the control server 210 may select a temporary parking position.

After determining the expected in-car temperature before departure for each parking position, selecting the optimal parking position or the temporary parking position to deliver the information related to the optimal parking position or the temporary parking position to the autonomous vehicle 220, and delivering information related to the re-riding time to the autonomous vehicle 220 or receiving the information related to the re-riding time from the autonomous vehicle 220 in S413, in S414, the control server 210 may identify whether a time remaining until the re-riding time reaches a specific time.

After identifying whether the time remaining until the re-riding time reaches the specific time in S414, when it is identified that the time remaining until the re-riding time reaches the specific time, in S418, the control server 210 may perform a request for vehicle movement to a predetermined position for passenger riding.

When identifying whether the time remaining until the re-riding time reaches the predetermined specific time in S414, when it is identified that the time remaining until the re-riding time does not reach the predetermined specific time, in S415, the control server 210 may identify whether the current parking position is a temporary parking position.

After identifying whether the current parking position is the temporary parking position in S415, when it is identified that the current parking position is not the temporary parking position, the autonomous vehicle 220 may return to S414 to identify whether the time remaining until the re-riding time reaches the predetermined specific time.

After identifying whether the current parking position is the temporary parking position in S415, when it is identified that the current parking position is the temporary parking position, in S416, the autonomous vehicle 220 may identify whether the optimal parking position is vacant.

After identifying whether the optimal parking position is vacant in S416, when it is identified that the optimal parking position is not vacant, the autonomous vehicle 220 may return to S414 to identify whether the time remaining until the re-riding time reaches the predetermined specific time.

After identifying whether the optimal parking position is vacant in S416, when it is identified that the optimal parking position is vacant, in S417, the autonomous vehicle 220 may select the optimal parking position which is vacant and may deliver information related to the optimal parking position and a signal necessary to change a parking position to the control server 210.

After delivering the information related to the optimal parking position and the signal necessary to change a parking position, in S418, the autonomous vehicle 220 may perform a request for vehicle movement to the predetermined position for passenger riding.

As an exemplary embodiment of the present disclosure, the control server 210 may transmit the request for vehicle movement to the predetermined position to the autonomous vehicle 220 for passenger riding.

Figure 5A:
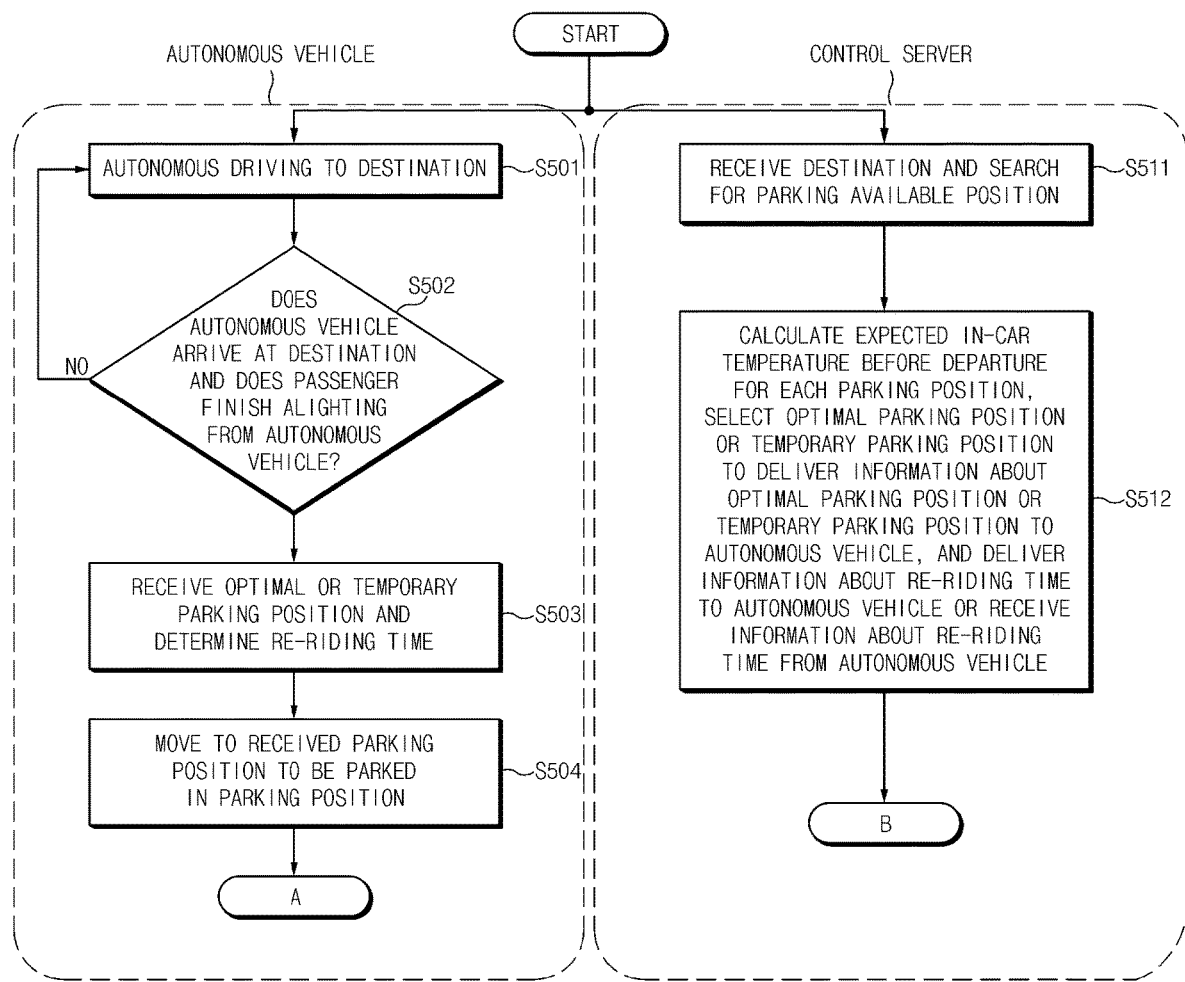
FIG. 5A and FIG. 5B are flowcharts illustrating that a system for controlling an in-car temperature of an autonomous vehicle performs control depending on an optimal parking position according to an exemplary embodiment of the present disclosure.
Figure 5B:
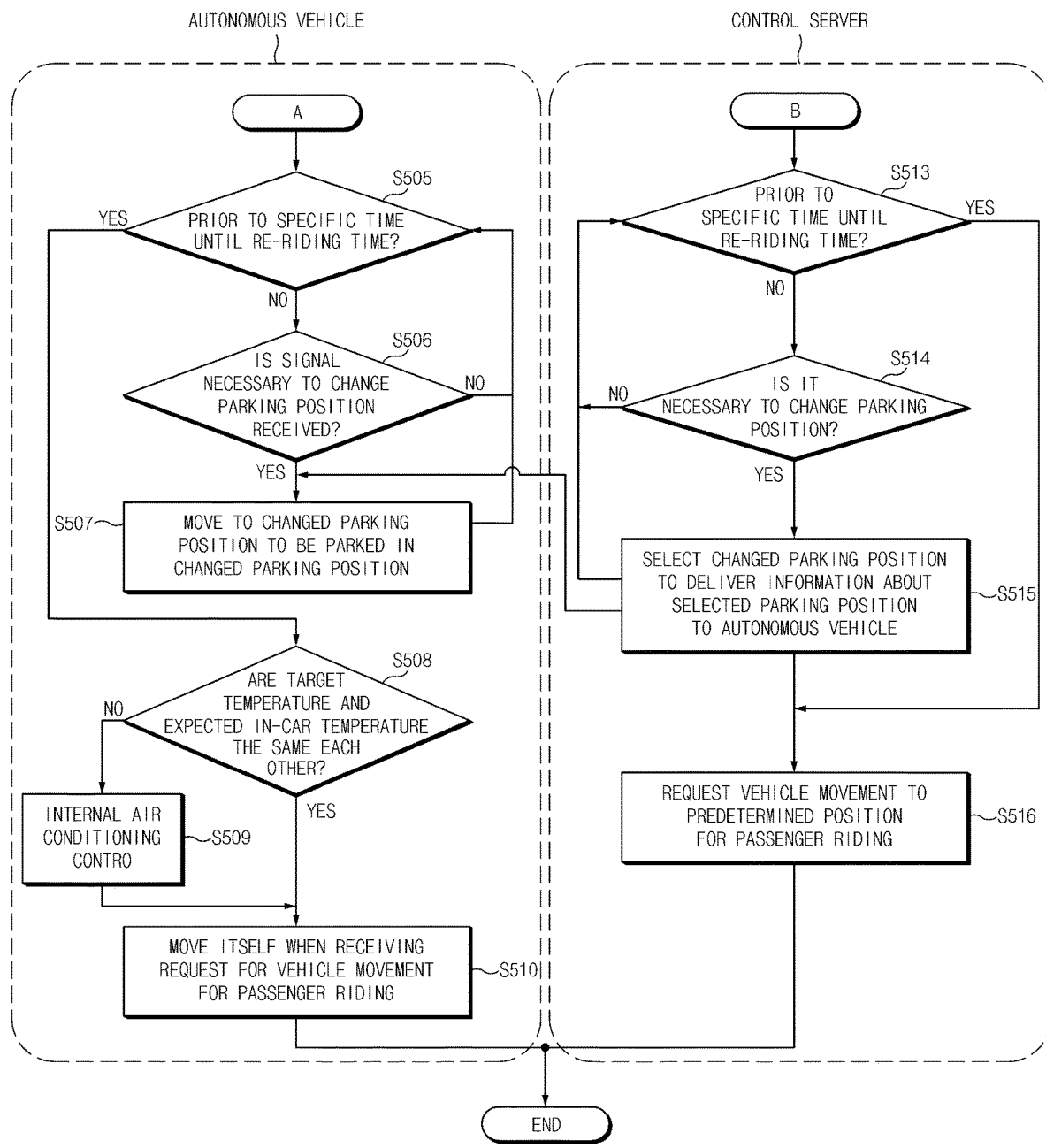

FIG. 5A and FIG. 5B are flowcharts illustrating that a system for controlling an in-car temperature of an autonomous vehicle performs control depending on an optimal parking position according to an exemplary embodiment of the present disclosure.

Referring to FIGS. 5A and 5B, in S501, an autonomous vehicle 220 of FIG. 2 may perform autonomous driving to a destination.

After performing the autonomous driving to the destination in S501, in S502, the autonomous vehicle 220 may arrive at the destination and may identify whether a passenger finishes alighting from the autonomous vehicle 310.

As an exemplary embodiment of the present disclosure, the autonomous vehicle 220 may identify whether the passenger finishes alighting from the autonomous vehicle 220 by a sensor which identifies whether the passenger rides in the autonomous vehicle 220.

After arriving at the destination and identifying whether the passenger finishes alighting from the autonomous vehicle 220 in S502, when it is identified that the autonomous vehicle 220 does not arrive at the destination and the passenger does not finish alighting from the autonomous vehicle 220, the autonomous vehicle 220 may return to S501 to perform autonomous driving to the destination.

After arriving at the destination and identifying whether the passenger finishes alighting from the autonomous vehicle 220 in S502, when it is identified that the autonomous vehicle 220 arrives at the destination and the passenger finishes alighting from the autonomous vehicle 220, in S503, the autonomous vehicle 220 may receive an optimal parking position or a temporary parking position and may determine a re-riding time.

As an exemplary embodiment of the present disclosure, the autonomous vehicle 220 may receive information related to the optimal parking position or the temporary parking position from a control server 210 of FIG. 2.

As an exemplary embodiment of the present disclosure, the autonomous vehicle 220 may receive a re-riding time from a user and may transmit information related to the re-riding time to the control server 210.

After receiving the optimal parking position or the temporary parking position and determining the re-riding time in S503, in S504, the autonomous vehicle 220 may move to the received parking position to be parked in the parking position.

As an exemplary embodiment of the present disclosure, the autonomous vehicle 220 may perform autonomous driving to the received parking position and may perform autonomous parking in the parking position.

After moving to the received parking position to be parked in the parking position in S504, in S505, the autonomous vehicle 220 may identify whether a time remaining until the re-riding time reaches a predetermined specific time.

When identifying whether the time remaining until the re-riding time reaches the predetermined specific time in S505, when it is identified that the time remaining until the re-riding time does not reach the predetermined specific time, in S506, the autonomous vehicle 220 may identify whether a signal necessary to change a parking position is received.

As an exemplary embodiment of the present disclosure, the autonomous vehicle 220 may receive the signal necessary to change the parking position from the control server 210.

After identifying whether the signal necessary to change the parking position is received in S406, when it is identified that the signal necessary to change the parking position is not received, the autonomous vehicle 220 may return to S505 to identify whether the time remaining until the re-riding time reaches the predetermined specific time.

After identifying whether the signal necessary to change the parking position is received in S506, when it is identified that the signal necessary to change the parking position is received, in S507, the autonomous vehicle 220 may move to the changed parking position to be parked in the changed parking position.

As an exemplary embodiment of the present disclosure, the autonomous vehicle 220 may perform autonomous driving to the changed parking position received from the control server 210 and may perform autonomous parking in the parking position.

After moving to the changed parking position to be parked in the changed parking position in S507, the autonomous vehicle 220 may return to S505 to identify whether the time remaining until the re-riding time reaches the predetermined specific time.

When identifying whether the time remaining until the re-riding time reaches the predetermined specific time in S505, when it is identified that the time remaining until the re-riding time reaches the predetermined specific time, in S508, the autonomous vehicle 220 may identify whether a target temperature and an expected in-car temperature are the same as each other.

As an exemplary embodiment of the present disclosure, the autonomous vehicle 220 may receive information related to the target temperature and the expected in-car temperature from the control server 210.

As an exemplary embodiment of the present disclosure, the autonomous vehicle 220 may receive information related to the expected in-car temperature from the control server 210 and may receive the target temperature from the user.

When identifying whether the target temperature and expected in-car temperature is the same as each other in S508, when it is identified that the target temperature and the expected in-car temperature is not the same as each other, in S509, the autonomous vehicle 220 may perform internal air conditioning control of the autonomous vehicle 220.

The autonomous vehicle 220 may compare the target temperature with the expected in-car temperature and may perform air conditioning control by a heater or an air conditioner of the autonomous vehicle 220.

After performing the internal air conditioning control of the autonomous vehicle 220, in S510, the autonomous vehicle 220 may receive a request for vehicle movement for passenger riding and may move itself.

As an exemplary embodiment of the present disclosure, the autonomous vehicle 220 may move itself and may perform internal air conditioning control of the autonomous vehicle 220.

When identifying whether the target temperature and the expected in-car temperature is the same as each other in S508, when it is identified that the target temperature and the expected in-car temperature is the same as each other, in S510, the autonomous vehicle 220 may receive a request for vehicle movement for passenger riding and may move itself.

As an exemplary embodiment of the present disclosure, the autonomous vehicle 220 may receive the request for vehicle movement for passenger riding from the control server 210.

As an exemplary embodiment of the present disclosure, the autonomous vehicle 220 may move itself to the re-riding position by autonomous driving.

In S511, the control server 210 may receive a destination and may search for a parking available position.

As an exemplary embodiment of the present disclosure, the control server 210 may receive information related to the destination from a user application or the autonomous vehicle 220 and may search for a parking available position based on a distance from the destination.

After receiving the destination and searching for the parking available position in S511, in S512, the control server 210 may determine an expected in-car temperature before departure for each parking position, may select an optimal parking position or a temporary parking position to deliver information related to the optimal parking position or the temporary parking position to the autonomous vehicle 220, and may deliver information related to a re-riding time to the autonomous vehicle 220 or may receive the information related to the re-riding time from the autonomous vehicle 220.

As an exemplary embodiment of the present disclosure, the control server 210 may receive information related to the re-riding time from the user application and may deliver the received information to the autonomous vehicle 220.

As an exemplary embodiment of the present disclosure, the control server 210 may determine an expected in-car temperature according to a re-riding time of each of one or more parking positions corresponding to the destination or the re-riding position of the autonomous vehicle 220 and may select an optimal parking position or a temporary parking position based on the expected in-car temperature, an outdoor air temperature according to the re-riding time, and a predetermined target temperature.

After determining the expected in-car temperature before departure for each parking position, selecting the optimal parking position or the temporary parking position to deliver the information related to the optimal parking position or the temporary parking position to the autonomous vehicle 220, and delivering information related to the re-riding time to the autonomous vehicle 220 or receiving the information related to the re-riding time from the autonomous vehicle 220 in S512, in S513, the control server 210 may identify whether a time remaining until the re-riding time reaches a specific time.

When identifying whether the time remaining until the re-riding time reaches the specific time in S513, when it is identified that the time remaining until the re-riding time does not reach the specific time, in S514, the control server 210 may identify whether it is necessary to change a parking position.

As an exemplary embodiment of the present disclosure, the control server 210 may identify whether it is necessary to change a parking position, based on whether there is another parking position where an actual in-car temperature does not meet a temperature condition or where an expected in-car temperature upon riding for another parking position is closer to the target temperature than an expected in-car temperature upon riding for the current parking position.

After identifying whether it is necessary to change the parking position in S514, when it is identified that it is not necessary to change the parking position, the control server 210 may return to S513 to identify whether the time remaining until the re-riding time reaches the specific time.

After identifying whether it is necessary to change the parking position in S514, when it is identified that it is necessary to change the parking position, in S515, the control server 210 may select the changed parking position and may deliver information related to the selected parking position to the autonomous vehicle 220.

As an exemplary embodiment of the present disclosure, the control server 210 may select another parking position where the expected in-car temperature is closest to the target temperature, among other parking positions where an expected in-car temperature upon riding for another parking position is closer to the target temperature than an expected in-car temperature upon riding for the current parking position, as the changed parking position.

After identifying whether the time remaining until the re-riding time reaches the specific time in S513, when it is identified that the time remaining until the re-riding time reaches the specific time, in S516, the control server 210 may perform a request for vehicle movement to a predetermined position for passenger riding.

As an exemplary embodiment of the present disclosure, the control server 210 may transmit the request for vehicle movement to the predetermined position to the autonomous vehicle 220 for passenger riding.

Figure 6:
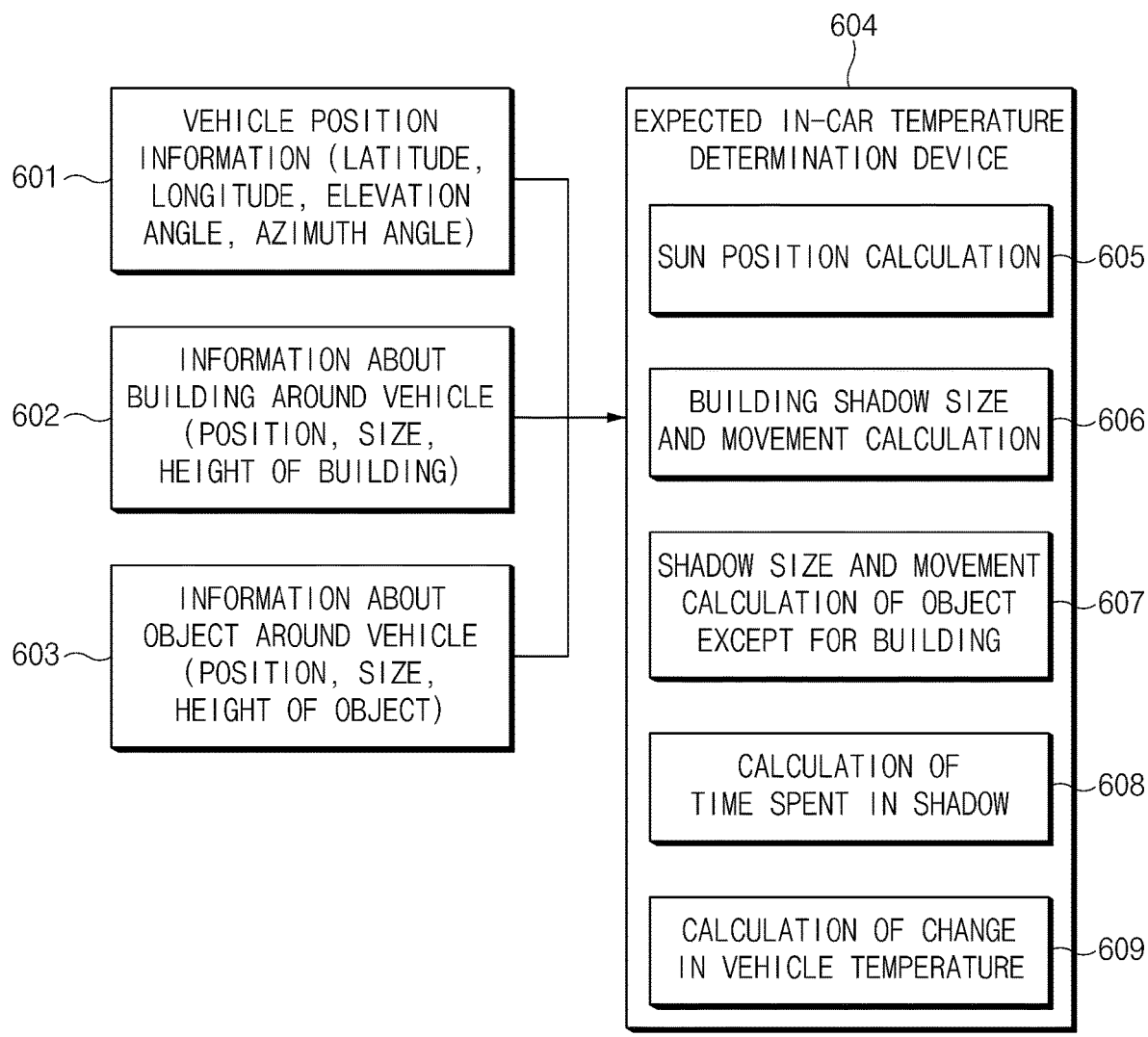
FIG. 6 is a drawing illustrating that an apparatus of controlling an in-car temperature of an autonomous vehicle determines an expected in-car temperature according to an exemplary embodiment of the present disclosure.

FIG. 6 is a drawing illustrating that an apparatus of controlling an in-car temperature of an autonomous vehicle determines an expected in-car temperature according to an exemplary embodiment of the present disclosure.

Referring to FIG. 6, an expected in-car temperature determination device 604 may perform sun position determination 605, building shadow size and movement determination 606, shadow size and movement determination 607 of an object except for a building, determination 608 of a time spent in the shadow, and determination of a change in vehicle temperature.

As an exemplary embodiment of the present disclosure, the expected in-car temperature determination device 604 may be included in an autonomous vehicle 220 of FIG. 2 or a controller 130 of FIG. 1.

As an exemplary embodiment of the present disclosure, the expected in-car temperature determination device 604 may receive vehicle position information 601, information 602 about a building around the vehicle, and information 605 about an object around the vehicle.

The vehicle position information 601 may include information related to at least one of a latitude, a longitude, an elevation angle, or an azimuth angle of the autonomous vehicle 220 and may be obtained by a Global Positioning System (GPS) provided in the autonomous vehicle 220.

The information related to the building around the vehicle may include at least one of a position, a size, or a height of the building and may be obtained by at least one of a camera, a Light Detection and Ranging (LiDAR), or a radar provided in the autonomous vehicle 220.

The information related to the object around the vehicle may include at least one of a position, a size, or a height of the object and may be obtained by at least one of the camera, the LiDAR, or the radar provided in the autonomous vehicle 220.

As an exemplary embodiment of the present disclosure, the expected in-car temperature determination device 604 may determine a position of the sun and a movement path of the sun, which correspond to position information of the autonomous vehicle 220.

As an exemplary embodiment of the present disclosure, the expected in-car temperature determination device 604 may determine a size and a movement path of a building shadow according to the information related to the building around the autonomous vehicle 220, based on the position of the sun and the movement path of the sun.

As an exemplary embodiment of the present disclosure, the expected in-car temperature determination device 604 may determine a size and a movement path of an object shadow according to the information related to the object around the autonomous vehicle 220, based on the position of the sun and the movement path of the sun.

As an exemplary embodiment of the present disclosure, the expected in-car temperature determination device 604 may determine a time when the autonomous vehicle 220 stays in the shadow before a user re-rides in the autonomous vehicle 220, based on the size and the movement path of the building shadow, the size and the movement path of the object shadow, and the position information of the autonomous vehicle 220.

As an exemplary embodiment of the present disclosure, the expected in-car temperature determination device 604 may determine a change in temperature of the autonomous vehicle 220 based on the time when the autonomous vehicle 220 stays in the shadow before the user re-rides in the autonomous vehicle 220 to determine an expected in-car temperature when the user re-rides in the autonomous vehicle 220.

Figure 7A:
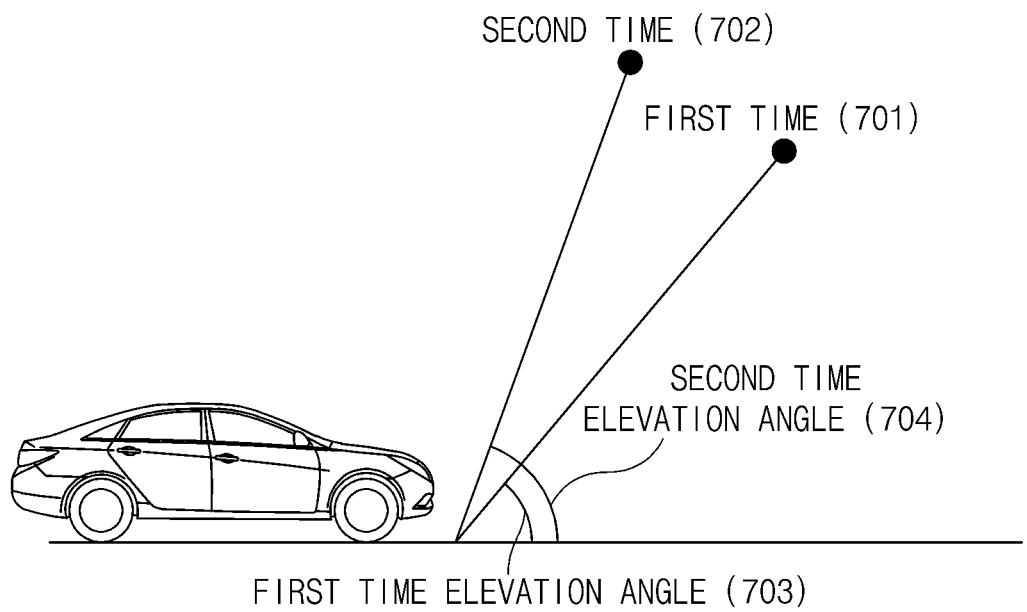
FIG. 7A and FIG. 7B are drawings illustrating that an apparatus of controlling an in-car temperature of an autonomous vehicle determines a movement path of the sun depending on an elevation angle or an azimuth angle according to an exemplary embodiment of the present disclosure.
Figure 7B:
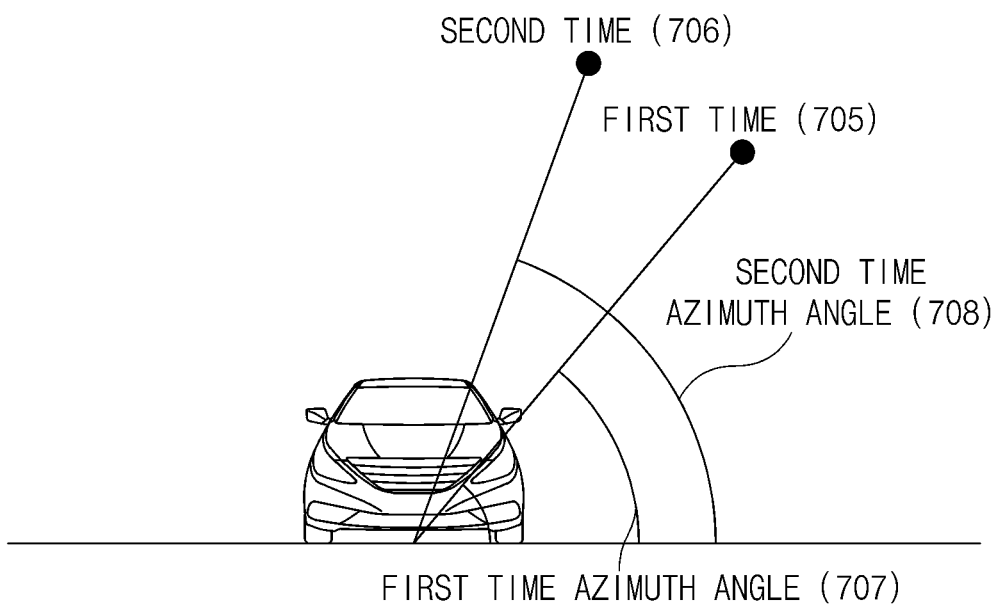

FIG. 7A and FIG. 7B are drawings illustrating that an apparatus of controlling an in-car temperature of an autonomous vehicle determines a movement path of the sun depending on an elevation angle or an azimuth angle according to an exemplary embodiment of the present disclosure.

Referring to FIG. 7A, an apparatus 100 for controlling an in-car temperature of an autonomous vehicle may determine a position of the sun, based on an elevation angle corresponding to a position of the autonomous vehicle.

As an exemplary embodiment of the present disclosure, the apparatus 100 for controlling the in-car temperature of the autonomous vehicle may determine a sun position 701 in a first time and a sun position 702 in a second time, which respectively correspond to a first time elevation angle 703 and a second time elevation angle 704 over time.

The elevation angle may refer to an angle formed by the ground and the sun according to the position of the autonomous vehicle.

Referring to FIG. 7B, the apparatus 100 for controlling the in-car temperature of the autonomous vehicle may determine a position of the sun, based on an azimuth angle corresponding to a position of the autonomous vehicle.

As an exemplary embodiment of the present disclosure, the apparatus 100 for controlling the in-car temperature of the autonomous vehicle may determine a sun position 705 in a first time and a sun position 706 in a second time, which respectively correspond to a first time azimuth angle 707 and a second time azimuth angle 708 over time.

The azimuth angle may refer to an angle formed by the direction of the sun according to the position of the autonomous vehicle and the north direction of the compass.

Thus, the apparatus 100 for controlling the in-car temperature of the autonomous vehicle may determine a movement path of the sun over time, based on the elevation angle and the azimuth angle corresponding to the position of the autonomous vehicle.

Figure 8A:
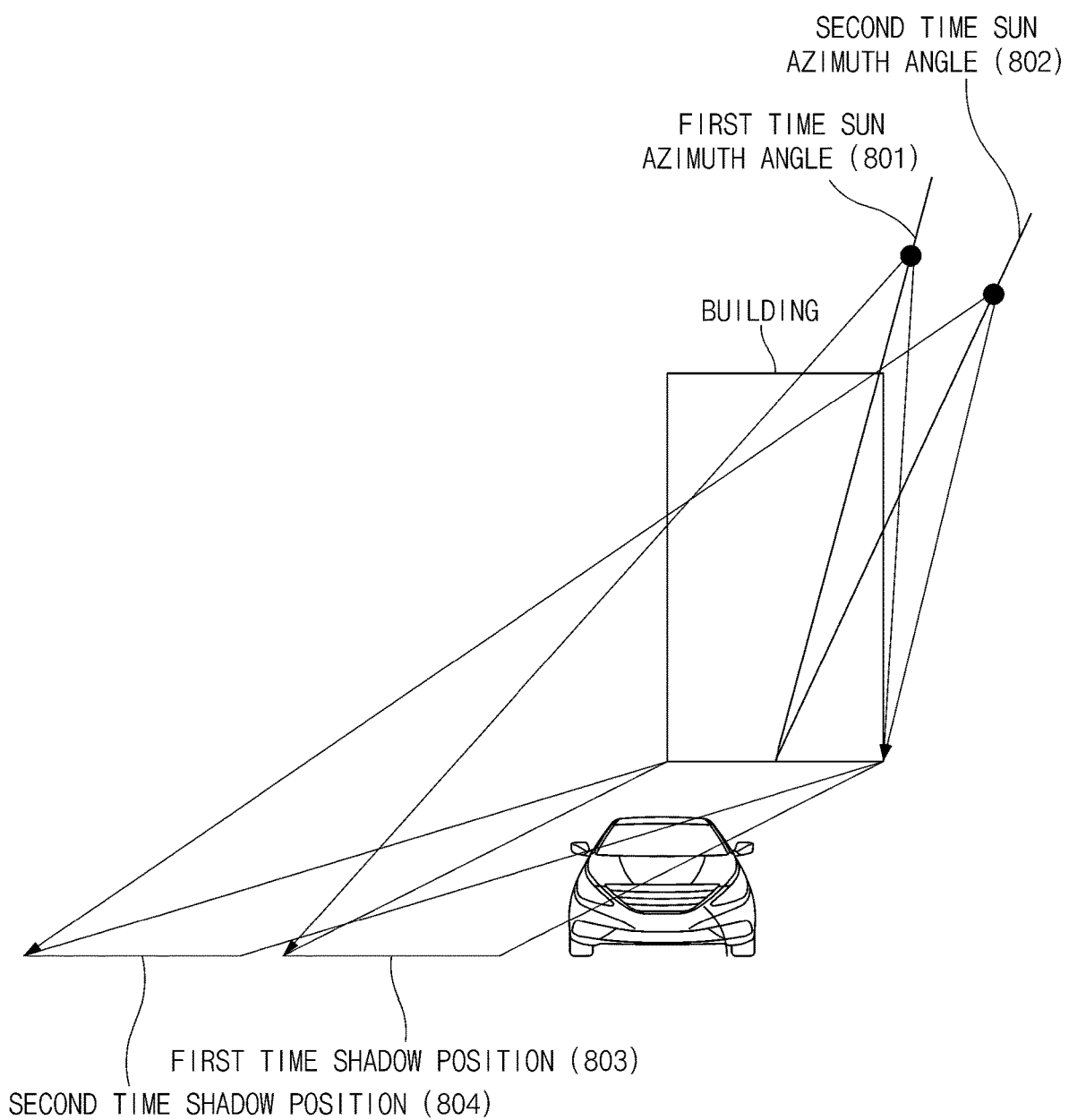
FIG. 8A, FIG. 8B and FIG. 8C are drawings illustrating that an apparatus of controlling an in-car temperature of an autonomous vehicle determines a position, a length, or a width of a shadow according to a building depending on an elevation angle or an azimuth angle according to an exemplary embodiment of the present disclosure.
Figure 8B:
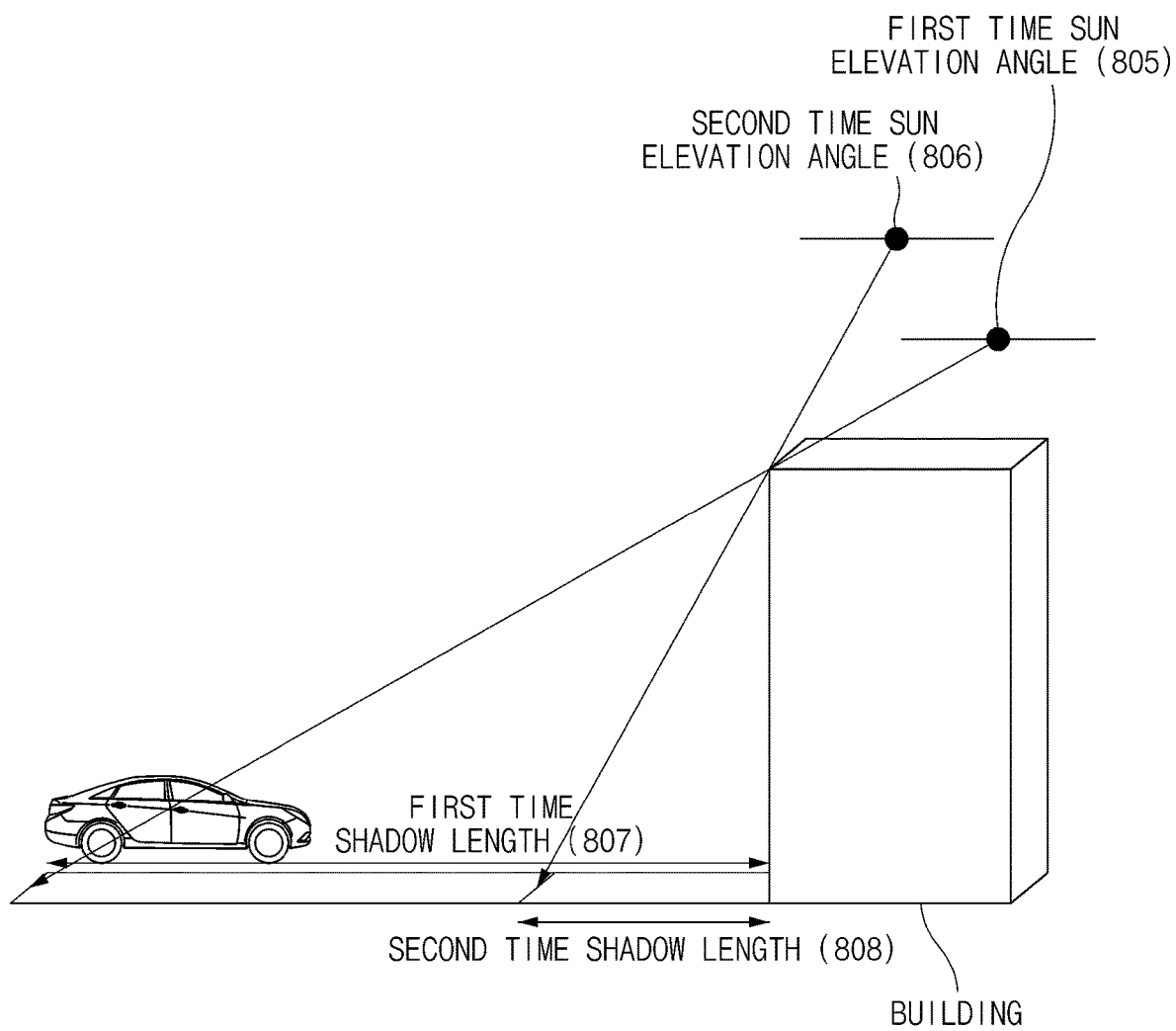
Figure 8C:
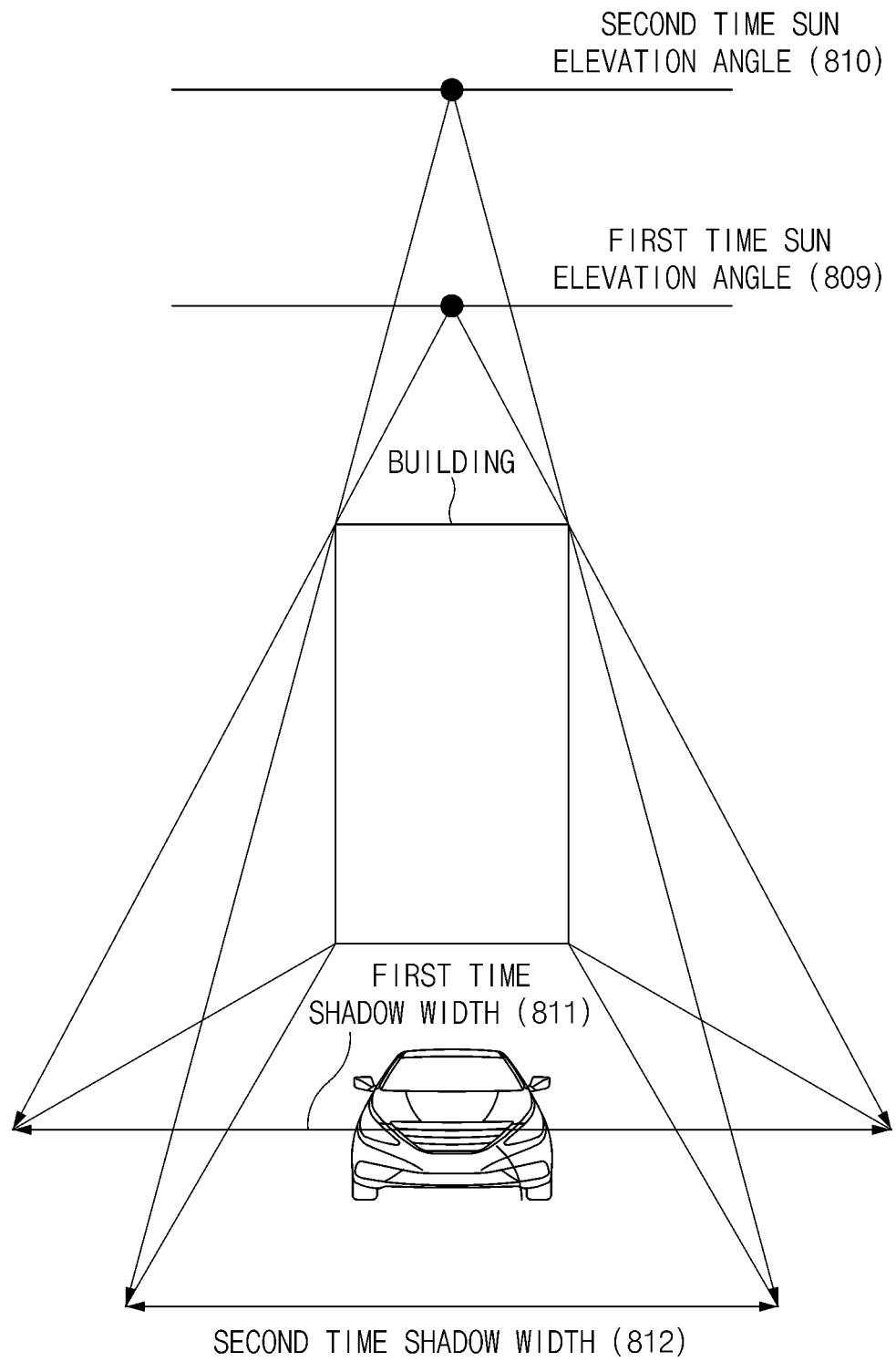

FIG. 8A, FIG. 8B and FIG. 8C are drawings illustrating that an apparatus of controlling an in-car temperature of an autonomous vehicle determines a position, a length, or a width of a shadow according to a building depending on an elevation angle or an azimuth angle according to an exemplary embodiment of the present disclosure.

Referring to FIG. 8A, an apparatus 100 for controlling an in-car temperature of an autonomous vehicle may determine a position of a shadow, based on a position of the sun and a position, a size, and a height of a building according to an azimuth angle corresponding to a position of the autonomous vehicle.

As an exemplary embodiment of the present disclosure, the apparatus 100 for controlling the in-car temperature of the autonomous vehicle may determine a sun position 801 in a first time and a sun position 802 in a second time, which respectively correspond to a first time azimuth angle and a second time azimuth angle over time.

As an exemplary embodiment of the present disclosure, the apparatus 100 for controlling the in-car temperature of the autonomous vehicle may determine a first time shadow position 803 and a second time shadow position 804 respectively according to the sun position 801 in the first time and the sun position 802 in the second time, based on the position, the size, and the height of the building.

Referring to FIGS. 8B and 8C, the apparatus 100 for controlling the in-car temperature of the autonomous vehicle may determine a length and a width of the shadow, based on the position of the sun and the position, the size, and the height of the building according to the elevation angle corresponding to the position of the autonomous vehicle.

As an exemplary embodiment of the present disclosure, the apparatus 100 for controlling the in-car temperature of the autonomous vehicle may determine a sun position 805 or 809 in a first time and a sun position 806 or 810 in a second time, which respectively correspond to a first time elevation angle and a second time elevation angle over time.

As an exemplary embodiment of the present disclosure, the apparatus 100 for controlling the in-car temperature of the autonomous vehicle may determine a first time shadow length 807 and a second time shadow length 808 respectively according to the sun position 805 in the first time and the sun position 806 in the second time, based on the position, the size, and the height of the building.

As an exemplary embodiment of the present disclosure, the apparatus 100 for controlling the in-car temperature of the autonomous vehicle may determine a first time shadow width 811 and a second time shadow width 812 respectively according to the sun position 809 in the first time and the sun position 810 in the second time, based on the position, the size, and the height of the building.

Thus, the apparatus 100 for controlling the in-car temperature of the autonomous vehicle may determine a movement path of the shadow over time, based on the elevation angle and the azimuth angle corresponding to the position, the size, and the height of the building and the position of the autonomous vehicle.

Furthermore, the case where the apparatus 100 for controlling the in-car temperature of the autonomous vehicle determines the movement path of the shadow for the building is described as an exemplary embodiment of the present disclosure, but the case where the apparatus 100 for controlling the in-car temperature of the autonomous vehicle determines a movement path of the shadow for an object rather than the building may also be performed in the same or similar manner.

Figure 9A:
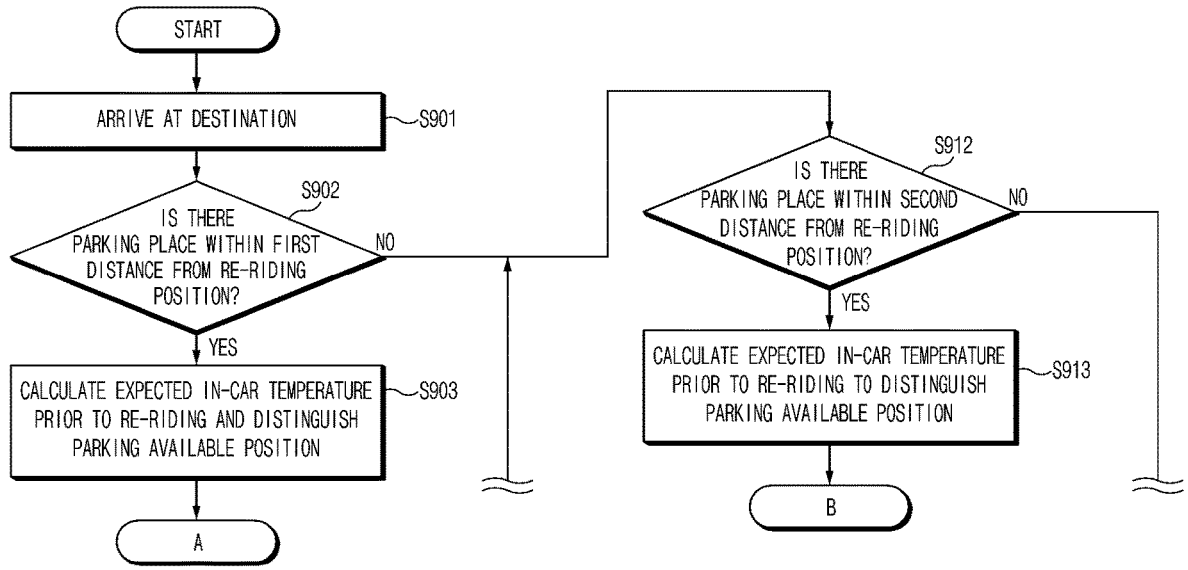
FIG. 9A and FIG. 9B are flowcharts illustrating a process where a system for controlling an in-car temperature of an autonomous vehicle operates according to an exemplary embodiment of the present disclosure.
Figure 9B:
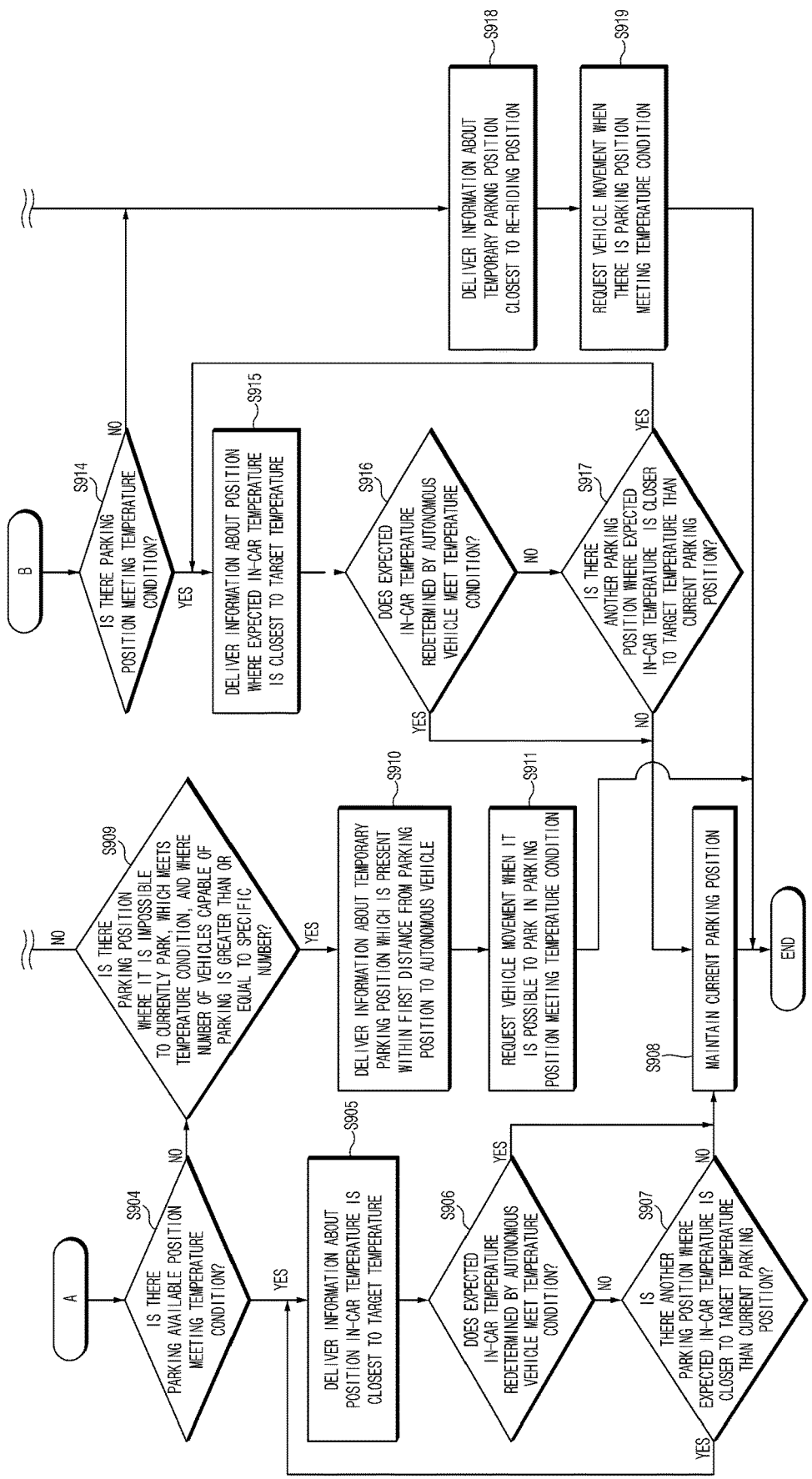

FIG. 9A and FIG. 9B are flowcharts illustrating a process where a system for controlling an in-car temperature of an autonomous vehicle operates according to an exemplary embodiment of the present disclosure.

Referring to FIGS. 9A and 9B, in S901, a system 200 for controlling an in-car temperature of an autonomous vehicle in FIG. 2 may identify whether an autonomous vehicle 220 of FIG. 2 arrives at a destination.

After identifying that the autonomous vehicle 220 arrives at the destination in S901, in S902, the system 200 for controlling the in-car temperature of the autonomous vehicle may identify whether there is a parking place within a first distance from a re-riding position.

As an exemplary embodiment of the present disclosure, the first distance may be set to 100 m, but not limited thereto. The first distance may be set another distance.

As an exemplary embodiment of the present disclosure, the system 200 for controlling the in-car temperature of the autonomous vehicle may identify whether there is the parking place within the first distance from the re-riding position using previously obtained map information, by a control server 210 of FIG. 2.

After identifying whether there is the parking place within the first distance from the re-riding position in S902, when it is identified that there is no parking place within the first distance from the re-riding position, in S912, the system 200 for controlling the in-car temperature of the autonomous vehicle may identify whether there is a parking place within a second distance from the re-riding position.

As an exemplary embodiment of the present disclosure, the second distance may be set to 200 m greater than the first distance, but not limited thereto. The second distance may be set to any distance greater than the first distance.

After identifying whether there is the parking place within the first distance from the re-riding position in S902, when it is identified that there is the parking place within the first distance from the re-riding position, in S903, the system 200 for controlling the in-car temperature of the autonomous vehicle may determine an expected in-car temperature prior to re-riding to distinguish a parking available position.

As an exemplary embodiment of the present disclosure, the system 200 for controlling the in-car temperature of the autonomous vehicle may select a parking place within the first distance from the re-riding position meeting a temperature condition where a value obtained by subtracting a difference between the expected in-car temperature and the target temperature from a difference between an outdoor air temperature according to the re-riding time and the target temperature is greater than a threshold.

After determining the expected in-car temperature prior to the re-riding and distinguishing the parking available position in S903, in S904, the system 200 for controlling the in-car temperature of the autonomous vehicle may identify whether there is a parking available position meeting the temperature condition.

After identifying whether there is the parking available position meeting the temperature condition in S904, when it is identified that there is no parking available position meeting the temperature condition, in S909, the system 200 for controlling the in-car temperature of the autonomous vehicle may identify whether there is a parking position where it is impossible to currently park, which meets the temperature condition, and where the number of vehicles configured for parking is greater than or equal to a specific number.

As an exemplary embodiment of the present disclosure, the specific number may be set to 20, but not limited thereto. The specific number may be set another number.

Because the more the number of vehicles configured for parking, the higher the possibility that there will be the vehicles which exit, the system 200 for controlling the in-car temperature of the autonomous vehicle may identify whether there is the parking position where it is impossible to currently park, which meets the temperature condition, and where the number of vehicles configured for parking is greater than or equal to the specific number.

After identifying whether there is the parking available position meeting the temperature condition in S904, when it is identified that there is the parking available position meeting the temperature condition, in S905, the system 200 for controlling the in-car temperature of the autonomous vehicle may deliver information related to a position where the expected in-car temperature is closest to the target temperature to the autonomous vehicle 220.

As an exemplary embodiment of the present disclosure, the control server 210 may deliver the information related to the position where the expected in-car temperature is closest to the target temperature to the autonomous vehicle 220.

After delivering the information related to the position where the expected in-car temperature is closest to the target temperature to the autonomous vehicle in S905, in S906, the system 200 for controlling the in-car temperature of the autonomous vehicle may identify whether an expected in-car temperature redetermined by the autonomous vehicle 220 meets the temperature condition.

As an exemplary embodiment of the present disclosure, the autonomous vehicle 220 may redetermine the expected in-car temperature according to the re-riding time, based on a time when a part or all of the autonomous vehicle 220 is included in a shadow generated by a surrounding building or a surrounding object and an initial in-car temperature.

After identifying whether the expected in-car temperature redetermined by the autonomous vehicle 220 meets the temperature condition in S906, when the expected in-car temperature redetermined by the autonomous vehicle 220 meets the temperature condition, in S908, the system 200 for controlling the in-car temperature of the autonomous vehicle may maintain a current parking position.

After identifying whether the expected in-car temperature redetermined by the autonomous vehicle 220 meets the temperature condition in S906, when the expected in-car temperature redetermined by the autonomous vehicle 220 does not meet the temperature condition, in S907, the system 200 for controlling the in-car temperature of the autonomous vehicle may identify whether there is another parking position where the expected in-car temperature is closer to the target temperature than the current parking position.

After identifying whether there is the other parking position where the expected in-car temperature is closer to the target temperature than the current parking position in S907, when it is identified that there is no another parking position where the expected in-car temperature is closer to the target temperature than the current parking position, the system 200 for controlling the in-car temperature of the autonomous vehicle may maintain the current parking position.

After identifying whether there is the other parking position where the expected in-car temperature is closer to the target temperature than the current parking position in S907, when it is identified that there is the other parking position where the expected in-car temperature is closer to the target temperature than the current parking position, the system 200 for controlling the in-car temperature of the autonomous vehicle may return to S905 to deliver information related to a position where the expected in-car temperature is closest to the target temperature to the autonomous vehicle 220.

After identifying whether there is the parking position where it is impossible to currently park, which meets the temperature condition, and where the number of vehicles configured for parking is greater than or equal to the specific number, when it is identified that there is no parking position where it is impossible to currently park, which meets the temperature condition, and where the number of vehicles configured for parking is greater than or equal to the specific number, in S912, the system 200 for controlling the in-car temperature of the autonomous vehicle may identify whether there is a parking place within a second distance from the re-riding position.

After identifying whether there is the parking position where it is impossible to currently park, which meets the temperature condition, and where the number of vehicles configured for parking is greater than or equal to the specific number, when it is identified that there is the parking position where it is impossible to currently park, which meets the temperature condition, and where the number of vehicles configured for parking is greater than or equal to the specific number, in S910, the system 200 for controlling the in-car temperature of the autonomous vehicle may deliver information related to a temporary parking position which is present within the first distance from the parking position to the autonomous vehicle 220.

As an exemplary embodiment of the present disclosure, the control server 210 may deliver the information related to the temporary parking position to the autonomous vehicle 220.

After delivering the information related to the temporary parking position which is present within the first distance from the parking position to the autonomous vehicle 220 in S910, in S911, the system 200 for controlling the in-car temperature of the autonomous vehicle may request vehicle movement when it is possible to park in the parking position meeting the temperature condition.

As an exemplary embodiment of the present disclosure, the control server 210 may transmit information related to the parking position meeting the temperature condition when it is possible to park in the parking position meeting the temperature condition and a vehicle movement request to the autonomous vehicle 220.

After identifying whether there is the parking place within the second distance from the re-riding position in S912, when it is identified that there is no parking place within the second distance from the re-riding position, in S918, the system 200 for controlling the in-car temperature of the autonomous vehicle may deliver information related to a temporary parking position closest to the re-riding position to the autonomous vehicle 220.

After identifying whether there is the parking place within the second distance from the re-riding position in S912, when it is identified that there is the parking place within the second distance from the re-riding position, in S913, the system 200 for controlling the in-car temperature of the autonomous vehicle may determine an expected in-car temperature prior to re-riding to distinguish a parking available position.

After determining the expected in-car temperature prior to the re-riding and distinguishing the parking available position in S913, in S914, the system 200 for controlling the in-car temperature of the autonomous vehicle may identify whether there is a parking position meeting the temperature condition.

After identifying whether there is the parking position meeting the temperature condition in S914, when it is identified that there is no parking position meeting the temperature condition, in S918, the system 200 for controlling the in-car temperature of the autonomous vehicle may deliver information related to a temporary parking position closest to the re-riding position to the autonomous vehicle 220.

After identifying whether there is the parking position meeting the temperature condition in S914, when it is identified that there is the parking position meeting the temperature condition, in S915, the system 200 for controlling the in-car temperature of the autonomous vehicle may deliver information related to a position where the expected in-car temperature is closest to the target temperature to the autonomous vehicle 220.

After delivering the information related to the position where the expected in-car temperature is closest to the target temperature to the autonomous vehicle in S915, in S916, the system 200 for controlling the in-car temperature of the autonomous vehicle may identify whether an expected in-car temperature redetermined by the autonomous vehicle 220 meets the temperature condition.

After identifying whether the expected in-car temperature redetermined by the autonomous vehicle 220 meets the temperature condition in S916, when it is identified that the expected in-car temperature redetermined by the autonomous vehicle 220 meets the temperature condition, in S908, the system 200 for controlling the in-car temperature of the autonomous vehicle may maintain a current parking position.

After identifying whether the expected in-car temperature redetermined by the autonomous vehicle 220 meets the temperature condition in S916, when it is identified that the expected in-car temperature redetermined by the autonomous vehicle 220 does not meet the temperature condition, in S917, the system 200 for controlling the in-car temperature of the autonomous vehicle may identify whether there is another parking position where the expected in-car temperature is closer to the target temperature than the current parking position.

After identifying whether there is the other parking position where the expected in-car temperature is closer to the target temperature than the current parking position in S917, when it is identified that there is no another parking position where the expected in-car temperature is closer to the target temperature than the current parking position, in S908, the system 200 for controlling the in-car temperature of the autonomous vehicle may maintain the current parking position.

After identifying whether there is the other parking position where the expected in-car temperature is closer to the target temperature than the current parking position in S917, when it is identified that there is the other parking position where the expected in-car temperature is closer to the target temperature than the current parking position, the system 200 for controlling the in-car temperature of the autonomous vehicle may return to S915 to deliver information related to a position where the expected in-car temperature is closest to the target temperature to the autonomous vehicle 220.

After delivering the information related to the temporary parking position closest to the re-riding position to the autonomous vehicle 220 in S918, in S919, the system 200 for controlling the in-car temperature of the autonomous vehicle may request vehicle movement when there is the parking position meeting the temperature condition.

Figure 10:
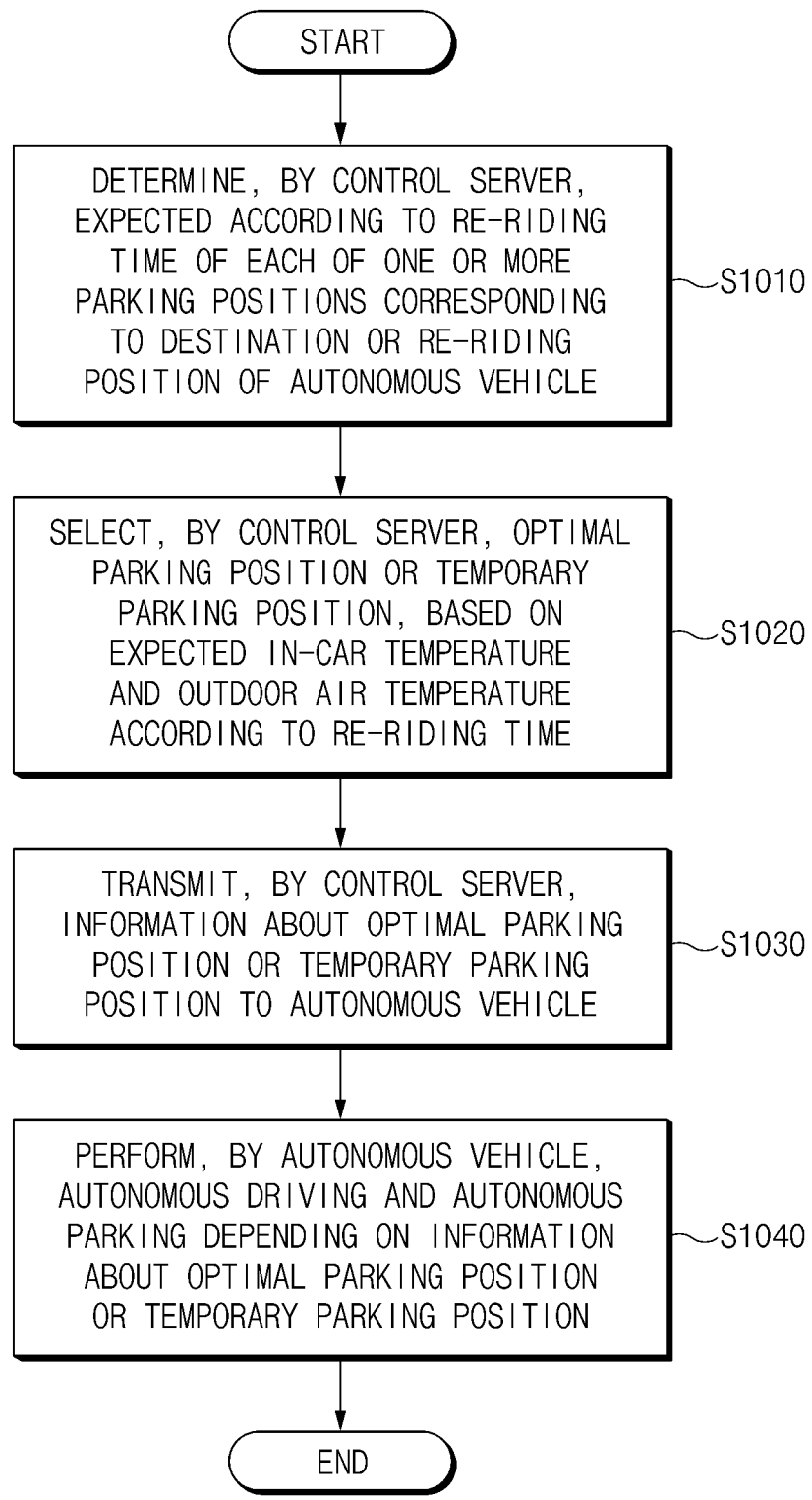
FIG. 10 is a flowchart illustrating a method for controlling an in-car temperature of an autonomous vehicle according to an exemplary embodiment of the present disclosure.

FIG. 10 is a flowchart illustrating a method for controlling an in-car temperature of an autonomous vehicle according to an exemplary embodiment of the present disclosure.

Referring to FIG. 10, the method for controlling the in-car temperature of the autonomous vehicle may include determining (S1010), by a control server, an expected in-car temperature according to a re-riding time of each of one or more parking positions corresponding to a destination or a re-riding position of an autonomous vehicle, selecting (S1020), by the control server, an optimal parking position or a temporary parking position, based on the expected in-car temperature and an outdoor air temperature according to the re-riding time, transmitting (S1030), by the control server, information related to the optimal parking position or the temporary parking position to the autonomous vehicle, and performing, by a controller of the autonomous vehicle, autonomous driving and autonomous parking according to the information related to the optimal parking position or the temporary parking position.

The determining (S1010) of the expected in-car temperature according to the re-riding time of each of the one or more parking positions corresponding to the destination or the re-riding position of the autonomous vehicle by the control server may include selecting, by the control server, the one or more parking positions corresponding to the destination or the re-riding position, based on a distance away from the destination or the re-riding position.

The selecting (S1020) of the optimal parking position or the temporary parking position based on the expected in-car temperature and the outdoor air temperature according to the re-riding time may include comparing, by the control server, a difference between the expected in-car temperature and a target temperature with a difference between the outdoor air temperature according to the re-riding time and the target temperature to select the outdoor air temperature or the temporary parking position.

As an exemplary embodiment of the present disclosure, the comparing of the difference between the expected in-car temperature and the target temperature with the difference between the outdoor air temperature according to the re-riding time and the target temperature to select the outdoor air temperature or the temporary parking position by the control server may include selecting, by the control server, a parking position having the expected in-car temperature closest to the target temperature as the optimal parking position, when there is a parking position where a value obtained by subtracting the difference between the expected in-car temperature and the target temperature from the difference between the outdoor air temperature according to the re-riding time and the target temperature is greater than a threshold.

As an exemplary embodiment of the present disclosure, the comparing of the difference between the expected in-car temperature and the target temperature with the difference between the outdoor air temperature according to the re-riding time and the target temperature to select the outdoor air temperature or the temporary parking position by the control server may include selecting, by the control server, the temporary parking position based on a distance away from the destination or the re-riding position, when there is no parking position where the value obtained by subtracting the difference between the expected in-car temperature and the target temperature from the difference between the outdoor air temperature according to the re-riding time and the target temperature is greater than the threshold.

As an exemplary embodiment of the present disclosure, the method for controlling the in-car temperature of the autonomous vehicle may further include redetermining, by the autonomous vehicle, the expected in-car temperature according to the re-riding time, based on a time when a part or all of the autonomous vehicle is disposed in a shadow generated by a surrounding building or a surrounding object and an initial in-car temperature, when performing the autonomous driving or the autonomous parking in the optimal parking position.

As an exemplary embodiment of the present disclosure, the redetermining of the expected in-car temperature according to the re-riding time by the autonomous vehicle may include determining, by the autonomous vehicle, the time when the part or all of the autonomous vehicle is disposed in the shadow generated by the surrounding building or the surrounding object, based on a movement path of the sun identified based on at least one of a latitude, a longitude, an elevation angle, or an azimuth angle corresponding to the position of the autonomous vehicle.

The operations of the method or the algorithm described in connection with the exemplary embodiments disclosed herein may be embodied directly in hardware or a software module executed by the processor or in a combination thereof. The software module may reside on a storage medium (that is, the memory/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

A description will be provided of effects of the apparatus of controlling the in-car temperature of the autonomous vehicle, the system including the same, and the method thereof according to various exemplary embodiments of the present disclosure.

According to at least one of embodiments of the present disclosure, the apparatus, the system, and the method may be provided to control an in-car temperature of an autonomous vehicle in conjunction with parking.

Furthermore, according to at least one of embodiments of the present disclosure, the apparatus of controlling the in-car temperature of the autonomous vehicle, the system including the same, and the method thereof are provided to move the parked autonomous vehicle to a suitable place to suitably maintain an in-car temperature.

Furthermore, according to at least one of embodiments of the present disclosure, the apparatus of controlling the in-car temperature of the autonomous vehicle, the system including the same, and the method thereof are provided to move to the parked autonomous vehicle to a suitable place to minimize air conditioning control and adjust an in-car temperature to be close to a desired target temperature.

Furthermore, according to at least one of embodiments of the present disclosure, the apparatus of controlling the in-car temperature of the autonomous vehicle, the system including the same, and the method thereof are provided to minimize air conditioning control to improve fuel efficiency of the autonomous vehicle.

Furthermore, according to at least one of embodiments of the present disclosure, the apparatus of controlling the in-car temperature of the autonomous vehicle, the system including the same, and the method thereof are provided to adjust an in-car temperature of the autonomous vehicle to increase satisfaction provided to the user who rides in the autonomous vehicle when the autonomous vehicle exits.

Furthermore, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of controlling an in-car temperature of an autonomous vehicle, the apparatus comprising:
    a sensor device provided in the autonomous vehicle and configured to obtain environmental information around the autonomous vehicle, wherein the environmental information includes a position, a size, and a height about a building or an object around the autonomous vehicle;
    a communication device configured with communicate with a control server; and
    a controller electrically connected to the sensor device and configured to transmit the environmental information related to the autonomous vehicle to the control server through the communication device, receive information related to an optimal parking position or a temporary parking position selected based on an expected in-car temperature and an outdoor air temperature according to a re-riding time of each of one or more parking positions corresponding to a destination or a re-riding position of the autonomous vehicle from the control server, through the communication device, and perform autonomous driving and autonomous parking according to the information related to the optimal parking position or the temporary parking position,
    wherein the controller is configured to:
        perform autonomous exit, when an exit command is received from the control server through the communication device;
        compare the expected in-car temperature and a predetermined target temperature; and
        perform internal air conditioning control and control an in-car temperature based on compared result.

2. The apparatus of claim 1, wherein the controller is configured to redetermine the expected in-car temperature according to the re-riding time, based on a time when a part or all of the autonomous vehicle is disposed in a shadow generated by a surrounding building or a surrounding object and an initial in-car temperature, when performing the autonomous driving or the autonomous parking in the optimal parking position.

3. A system for controlling an in-car temperature of an autonomous vehicle, the system comprising:
    a control server configured to determine an expected in-car temperature according to a re-riding time of each of one or more parking positions corresponding to a destination or a re-riding position of the autonomous vehicle based on environmental information around the autonomous vehicle obtained by the autonomous vehicle, select an optimal parking position or a temporary parking position based on the expected in-car temperature, an outdoor air temperature according to the re-riding time, and a predetermined target temperature, and transmit information related to the optimal parking position or the temporary parking position to the autonomous vehicle; and the autonomous vehicle including a controller configured to perform autonomous driving and autonomous parking according to the information related to the optimal parking position or the temporary parking position, wherein the environmental information includes a position, a size, and a height about a building or an object around the autonomous vehicle, wherein the autonomous vehicle is configured to:
perform autonomous exit, when an exit command is received from the control server;
compare the expected in-car temperature and a predetermined target temperature; and
perform internal air conditioning control and control an in-car temperature based on compared result.

4. The system of claim 3, wherein the control server is configured to select the one or more parking positions corresponding to the destination or the re-riding position, based on a distance away from the destination or the re-riding position.

5. The system of claim 3, wherein the control server is configured to compare a difference between the expected in-car temperature and the target temperature with a difference between an outdoor air temperature according to the re-riding time and the target temperature to select the optimal parking position or the temporary parking position.

6. The system of claim 5, wherein the control server is configured to select a parking position having the expected in-car temperature closest to the target temperature as the optimal parking position, when there is a parking position where a value obtained by subtracting the difference between the expected in-car temperature and the target temperature from the difference between the outdoor air temperature according to the re-riding time and the target temperature is greater than a threshold.

7. The system of claim 5, wherein the control server is configured to select the temporary parking position, based on a distance away from the destination or the re-riding position, when there is no parking position where a value obtained by subtracting the difference between the expected in-car temperature and the target temperature from the difference between the outdoor air temperature according to the re-riding time and the target temperature is greater than a threshold.

8. The system of claim 7,
wherein the control server is configured to select a parking position having the expected in-car temperature closest to the target temperature as the optimal parking position, when there is the parking position where the value obtained by subtracting the difference between the expected in-car temperature and the target temperature from the difference between the outdoor air temperature according to the re-riding time and the target temperature is greater than the threshold, when the autonomous vehicle is parked in the temporary parking position and configured to transmit information related to the optimal parking position to the autonomous vehicle, and
wherein the controller of the autonomous vehicle is configured to perform the autonomous driving and the autonomous parking in the optimal parking position in a state where the autonomous vehicle is parked in the temporary parking position.

9. The system of claim 3, wherein the controller of the autonomous vehicle is configured to redetermine the expected in-car temperature according to the re-riding time, based on a time when a part or all of the autonomous vehicle is disposed in a shadow generated by a surrounding building or a surrounding object and an initial in-car temperature, when performing the autonomous driving or the autonomous parking in the optimal parking position.

10. The system of claim 9, wherein the controller of the autonomous vehicle is configured to determine the time when the part or all of the autonomous vehicle is disposed in the shadow generated by the surrounding building or the surrounding object, based on a movement path of the sun identified based on at least one of a latitude, a longitude, an elevation angle, or an azimuth angle corresponding to a position of the autonomous vehicle.

11. The system of claim 9, wherein the control server is configured to determine whether there is a need to change a parking position of the autonomous vehicle, based on a difference between the redetermined expected in-car temperature and the target temperature.

12. The system of claim 9, wherein the controller of the autonomous vehicle is configured to redetermine the expected in-car temperature according to the re-riding time, with regard to at least one of a color of the autonomous vehicle, current weather, or a season.

13. The system of claim 9,
wherein the control server is configured to transmit the exit command to the autonomous vehicle, when a time remaining until the re-riding time reaches a predetermined specific time.

14. A method for controlling an in-car temperature of an autonomous vehicle, the method comprising:
determining, by a control server, an expected in-car temperature according to a re-riding time of each of one or more parking positions corresponding to a destination or a re-riding position of the autonomous vehicle, based on environmental information around the autonomous vehicle obtained by the autonomous vehicle;
selecting, by the control server, an optimal parking position or a temporary parking position based on the expected in-car temperature and an outdoor air temperature according to the re-riding time;
transmitting, by the control server, information related to the optimal parking position or the temporary parking position to the autonomous vehicle; and
performing, by a controller of the autonomous vehicle, autonomous driving and autonomous parking according to the information related to the optimal parking position or the temporary parking position,
wherein the environmental information includes a position, a size, and a height about a building or an object around the autonomous vehicle,
performing, by the controller, autonomous exit, when an exit command is received from the control server through the communication device;
comparing, by the controller, the expected in-car temperature and a predetermined target temperature;
performing, by the controller, internal air conditioning control and control an in-car temperature based on compared result.

15. The method of claim 14, wherein the selecting of the optimal parking position or the temporary parking position by the control server includes:
comparing, by the control server, a difference between the expected in-car temperature and a target temperature with a difference between an outdoor air temperature according to the re-riding time and the target temperature to select the optimal parking position or the temporary parking position.

16. The method of claim 15, wherein the comparing of the difference between the expected in-car temperature and the target temperature with the difference between the outdoor air temperature according to the re-riding time and the target temperature to select the optimal parking position or the temporary parking position by the control server includes:
selecting, by the control server, a parking position having the expected in-car temperature closest to the target temperature as the optimal parking position, when there is a parking position where a value obtained by subtracting the difference between the expected in-car temperature and the target temperature from the difference between the outdoor air temperature according to the re-riding time and the target temperature is greater than a threshold.

17. The method of claim 15, wherein the comparing of the difference between the expected in-car temperature and the target temperature with the difference between the outdoor air temperature according to the re-riding time and the target temperature to select the optimal parking position or the temporary parking position by the control server includes:
selecting, by the control server, the temporary parking position, based on a distance away from the destination or the re-riding position, when there is no parking position where a value obtained by subtracting the difference between the expected in-car temperature and the target temperature from the difference between the outdoor air temperature according to the re-riding time and the target temperature is greater than a threshold.

18. The method of claim 15, further including:
redetermining, by the controller of the autonomous vehicle, the expected in-car temperature according to the re-riding time, based on a time when a part or all of the autonomous vehicle is disposed in a shadow generated by a surrounding building or a surrounding object and an initial in-car temperature, when performing the autonomous driving or the autonomous parking in the optimal parking position.

19. The method of claim 18, wherein the redetermining of the expected in-car temperature according to the re-riding time by the autonomous vehicle includes:
determining, by the controller of the autonomous vehicle, the time when the part or all of the autonomous vehicle is disposed in the shadow generated by the surrounding building or the surrounding object, based on a movement path of the sun identified based on at least one of a latitude, a longitude, an elevation angle, or an azimuth angle corresponding to a position of the autonomous vehicle.

* * * * *